US012750520B2

(12) United States Patent
Chen et al.

(10) Patent No.: US 12,750,520 B2
(45) Date of Patent: Sep. 29, 2026

(54) TEMPLATE MATCHING-BASED MOTION REFINEMENT IN VIDEO CODING

(71) Applicant: Alibaba (China) Co., Ltd., Hangzhou (CN)

(72) Inventors: Jie Chen, Beijing (CN); Ru-Ling Liao, Sunnyvale, CA (US); Xinwei Li, Beijing (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 2 days.

(21) Appl. No.: 18/896,014

(22) Filed: Sep. 25, 2024

(65) Prior Publication Data

US 2025/0113053 A1 Apr. 3, 2025

Related U.S. Application Data

(60) Provisional application No. 63/569,681, filed on Mar. 25, 2024, provisional application No. 63/619,059,
(Continued)

(51) Int. Cl.
*H04N 19/513* (2014.01)
*H04N 19/105* (2014.01)
(Continued)

(52) U.S. Cl.
CPC ......... *H04N 19/521* (2014.11); *H04N 19/105* (2014.11); *H04N 19/119* (2014.11);
(Continued)

(58) Field of Classification Search
CPC .................................................. H04N 19/521
(Continued)

(56) References Cited

U.S. PATENT DOCUMENTS

| | | | | |
|---|---|---|---|---|
| 11,388,421 | B1 * | 7/2022 | Wang .................... | H04N 19/11 |
| 2010/0208827 | A1 * | 8/2010 | Divorra Escoda ... | H04N 19/176 375/240.24 |

(Continued)

FOREIGN PATENT DOCUMENTS

| | | | |
|---|---|---|---|
| CN | 110140355 | A | 8/2019 |
| CN | 116671107 | A | 8/2023 |

(Continued)

OTHER PUBLICATIONS

"Requirements for a Future Video Coding Standard v5," International Organisation for Standardisation, Torino, IT, 14 pages (2017).

(Continued)

*Primary Examiner* — Leron Beck
(74) *Attorney, Agent, or Firm* — Finnegan, Henderson, Farabow, Garrett & Dunner, LLP

(57) ABSTRACT

Methods and apparatuses are provided for motion template-matching-based motion refinement. An exemplary method includes: dividing a target coding block into a plurality of subblocks; determining a first plurality of templates associated with the plurality of subblocks; determining a plurality of reference templates based on the first plurality of templates; performing motion compensation to the target coding block based on an affine merge candidate; and refining the motion compensation by matching the first plurality of templates and the plurality of reference templates.

19 Claims, 38 Drawing Sheets

Related U.S. Application Data filed on Jan. 9, 2024, provisional application No. 63/587,492, filed on Oct. 3, 2023.

(51) Int. Cl.

| | |
|---|---|
| ***H04N 19/119*** | (2014.01) |
| ***H04N 19/139*** | (2014.01) |
| ***H04N 19/176*** | (2014.01) |
| ***H04N 19/54*** | (2014.01) |

(52) U.S. Cl.

CPC ......... *H04N 19/139* (2014.11); *H04N 19/176* (2014.11); *H04N 19/54* (2014.11)

(58) Field of Classification Search

USPC ...................................................... 375/240.16

See application file for complete search history.

(56) References Cited

U.S. PATENT DOCUMENTS

| | | | | |
|---|---|---|---|---|
| 2014/0269939 | A1* | 9/2014 | Guo | H04N 19/34 375/240.26 |
| 2017/0353730 | A1* | 12/2017 | Liu | H04N 19/159 |
| 2018/0098086 | A1* | 4/2018 | Chuang | H04N 19/198 |
| 2018/0255295 | A1* | 9/2018 | Lee | H04N 19/593 |
| 2019/0215531 | A1* | 7/2019 | Lee | H04N 19/577 |
| 2019/0335181 | A1* | 10/2019 | Abe | H04N 19/139 |
| 2020/0053364 | A1* | 2/2020 | Seo | H04N 19/503 |
| 2020/0366900 | A1* | 11/2020 | Jun | H04N 19/593 |
| 2021/0021847 | A1* | 1/2021 | Moon | H04N 19/46 |
| 2021/0067776 | A1* | 3/2021 | Reuze | H04N 19/573 |
| 2021/0152825 | A1* | 5/2021 | Reuze | H04N 19/119 |
| 2022/0021883 | A1* | 1/2022 | Esenlik | H04N 19/583 |
| 2022/0191504 | A1* | 6/2022 | Gao | H04N 19/543 |
| 2022/0329824 | A1* | 10/2022 | Liao | H04N 19/176 |
| 2022/0385888 | A1* | 12/2022 | Lee | H04N 19/61 |
| 2022/0417500 | A1* | 12/2022 | Huang | H04N 19/176 |
| 2023/0103767 | A1 | 4/2023 | Chang et al. | |
| 2023/0104476 | A1* | 4/2023 | Chen | H04N 19/52 375/240.02 |
| 2023/0247216 | A1 | 8/2023 | Huang et al. | |
| 2024/0146908 | A1* | 5/2024 | Zhang | H04N 19/567 |
| 2024/0291972 | A1* | 8/2024 | Liao | H04N 19/105 |

FOREIGN PATENT DOCUMENTS

| | | | |
|---|---|---|---|
| WO | 2023060912 | A1 | 4/2023 |
| WO | 2023158766 | A1 | 8/2023 |

OTHER PUBLICATIONS

Chang et al., "Compression efficiency methods beyond VVC," JVET-U0100, 21st Meeting, by teleconference, Jan. 6-15, 2021, 13 pages.

Chen et al., "Algorithm Description of Joint Exploration Test Model 7 (JEM 7)," JVET-G1001-v1, 7th Meeting: Torino, IT, Jul. 13-21, 2017, 50 pages.

Chen et al., "Algorithm description for Versatile Video Coding and Test Model 11 (VTM 11)," JVET-T2002- v1, 20th meeting by teleconference, Oct. 7-16, 2020, 104 pages.

Coban et al., "Algorithm description of Enhanced Compression Model 4 (ECM 4)" JVET-Y2025, 23rd Meeting, by teleconference, Jul. 7-16, 2021, 32 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://vet.hhi.fraunhofer.de/svn/svn_HMJEMSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

PCT International Search Report and Written Opinion mailed Dec. 23, 2024, issued in corresponding International Application No. PCT/CN2024/123062 (7 pgs.).

* cited by examiner 4 parameter affine model
1100A

6 parameter affine model
1100B

Non-adjacent neighbor

Adjacent neighbor

TEMPLATE MATCHING-BASED MOTION REFINEMENT IN VIDEO CODING

CROSS-REFERENCE TO RELATED APPLICATIONS

The disclosure claims the benefits of priority to U.S. Provisional Application No. 63/587,492, filed on Oct. 3, 2023; U.S. Provisional Application No. 63/619,059, filed on Jan. 9, 2024; and U.S. Provisional Application No. 63/569,681, filed on Mar. 25, 2024. All the claimed provisional applications are incorporated herein by reference in their entireties.

TECHNICAL FIELD

The present disclosure generally relates to video processing, and more particularly, to methods and apparatuses for motion template-matching-based motion refinement.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods and apparatuses for motion template-matching-based motion refinement.

According to some exemplary embodiments, there is provided a method of encoding video content. The method includes: dividing a target coding block into a plurality of subblocks; determining a plurality of sub-templates based on the plurality of subblocks; and refining motion vectors of the plurality of subblocks based on the plurality of sub-templates.

According to some exemplary embodiments, there is provided a method of decoding a bitstream associated with video content. The method includes: decoding the bitstream to reconstruct a target coding block, wherein the target coding block is divided into a plurality of subblocks; determining a plurality of sub-templates based on the plurality of subblocks; and refining motion vectors of the plurality of subblocks based on the plurality of sub-templates.

According to some exemplary embodiments, there is provided a method of storing a bitstream associated with video content. The method includes: dividing a target coding block into a plurality of subblocks; determining a plurality of sub-templates based on the plurality of subblocks; refining motion vectors of the plurality of subblocks based on the plurality of sub-templates; generating the bitstream based on the refined motion vectors; and storing the bitstream in a non-transitory computer-readable storage medium.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
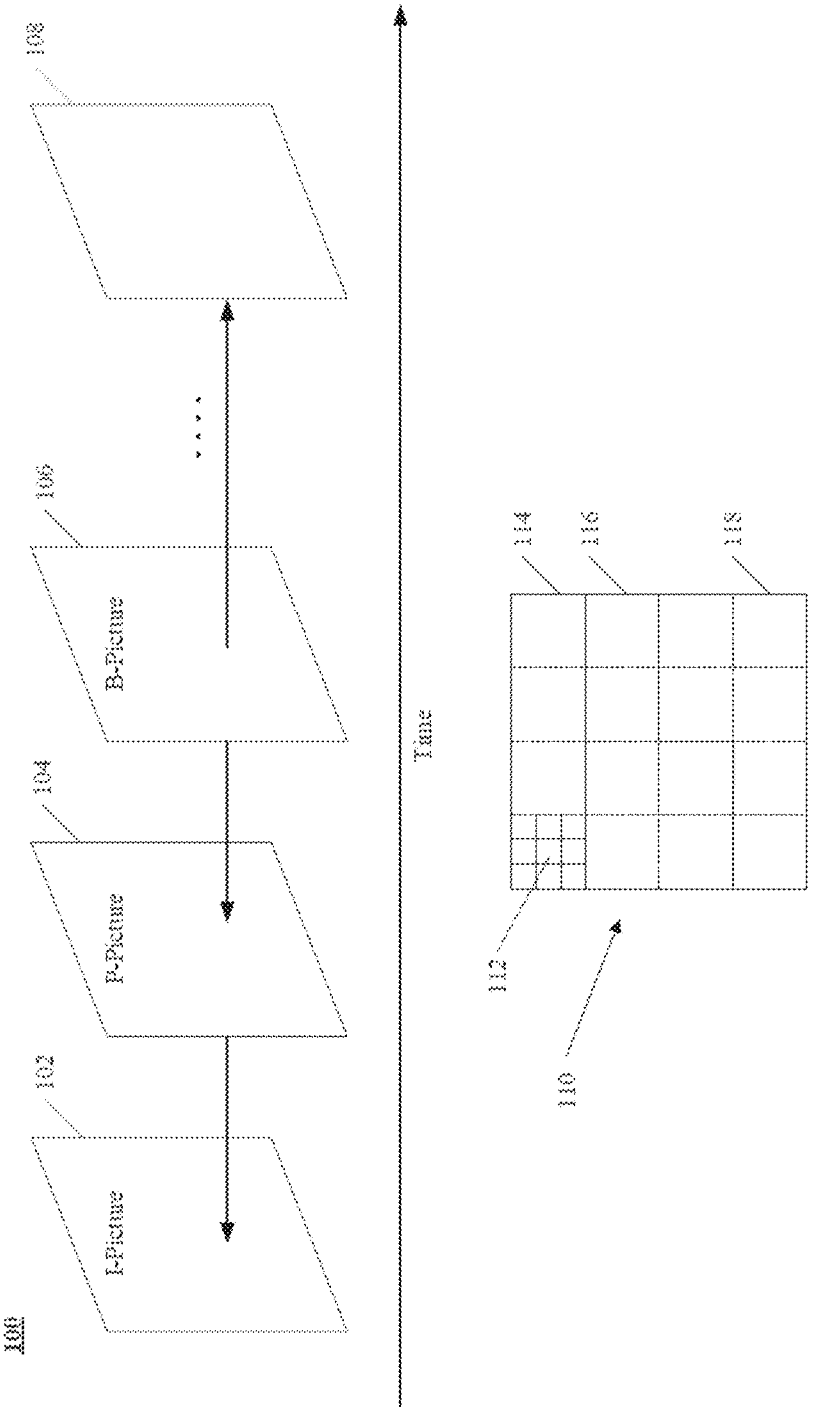
FIG. 1 illustrates structures of an exemplary video sequence, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Video coding systems are often used to compress digital video signals, for instance to reduce storage space consumed or to reduce transmission bandwidth consumption associated with such signals. With high-definition (HD) videos (e.g., having a resolution of 1920×1080 pixels) gaining popularity in various applications of video compression, such as online video streaming, video conferencing, or video monitoring, it is a continuous need to develop video coding tools that can increase compression efficiency of video data.

For example, video monitoring applications are increasingly and extensively used in many application scenarios (e.g., security, traffic, environment monitoring, or the like), and the numbers and resolutions of the monitoring devices keep growing rapidly. Many video monitoring application scenarios prefer to provide HD videos to users to capture more information, which has more pixels per frame to capture such information. However, an HD video bitstream can have a high bitrate that demands high bandwidth for transmission and large space for storage. For example, a monitoring video stream having an average 1920×1080 resolution can require a bandwidth as high as 4 Mbps for real-time transmission. Also, the video monitoring generally monitors 7×24 continuously, which can greatly challenge a storage system, if the video data is to be stored. The demand for high bandwidth and large storage of the HD videos has therefore become a major limitation to its large-scale deployment in video monitoring.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for monitoring, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

As previously mentioned, video monitoring that uses HD videos faces challenges of demands of high bandwidth and large storage. For addressing such challenges, the bitrate of the encoded video can be reduced. Among the I-, P-, and B-pictures, I-pictures have the highest bitrate. Because the backgrounds of most monitoring videos are nearly static, one way to reduce the overall bitrate of the encoded video can be using fewer I-pictures for video encoding.

However, the improvement of using fewer I-pictures can be trivial because the I-pictures are typically not dominant in the encoded video. For example, in a typical video bitstream, the ratio of I-, B-, and P-pictures can be 1:20:9, in which the I-pictures can account for less than 10% of the total bitrate. In other words, in such an example, even all I-pictures are removed, the reduced bitrate can be no more than 10%.

FIG. 1 illustrates structures of an example video sequence 100, consistent with embodiments of the disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC).

A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
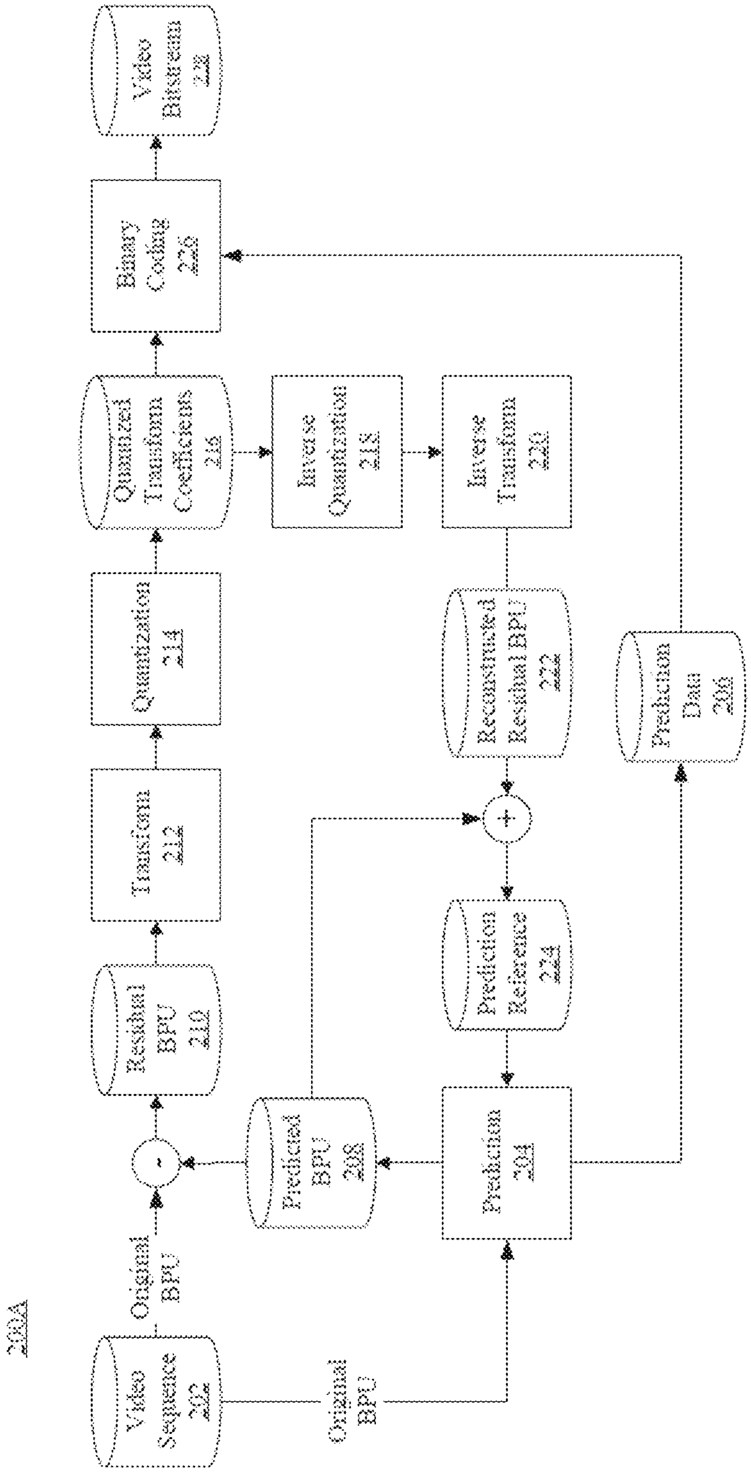
FIG. 2A illustrates a schematic diagram of an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
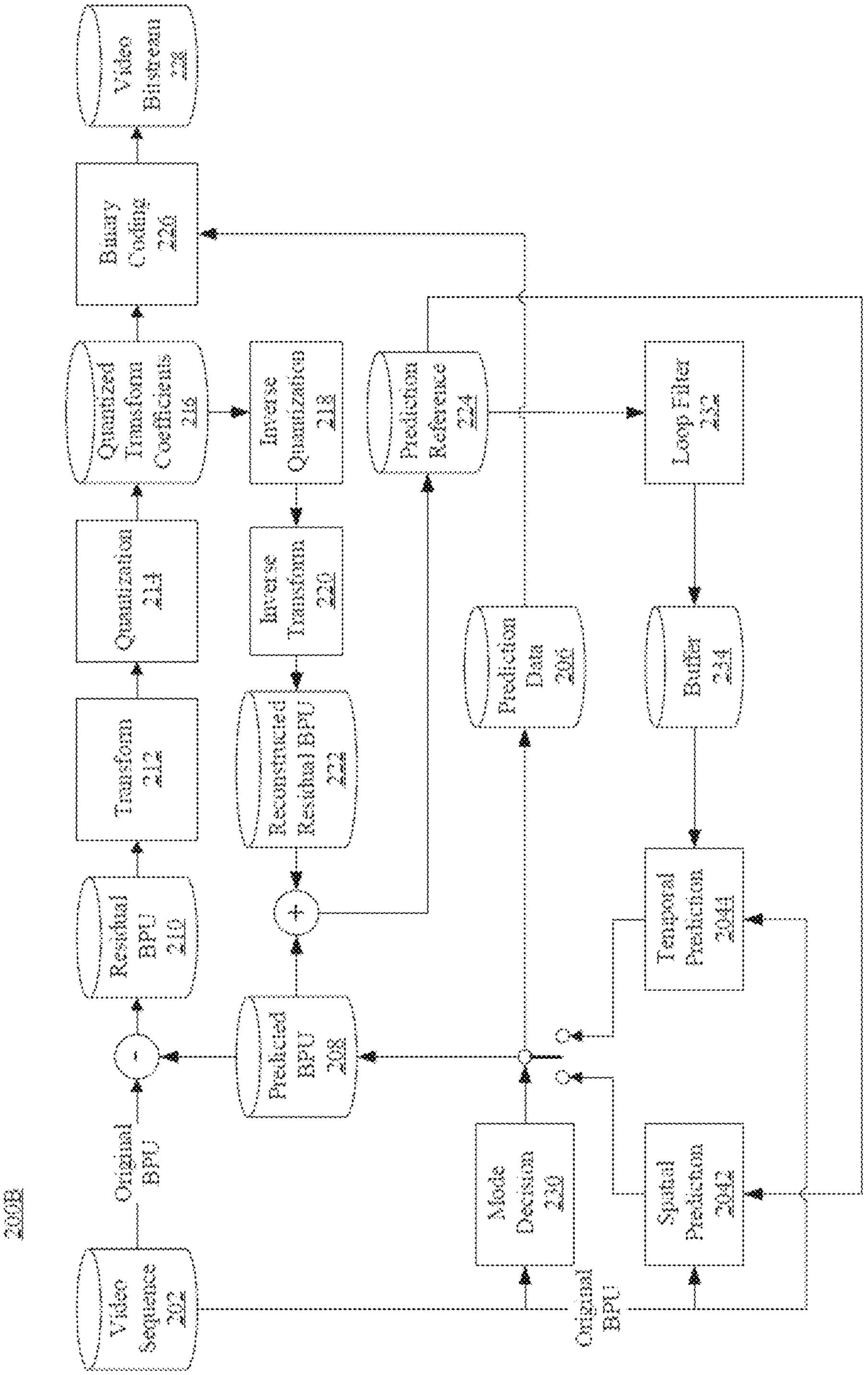
FIG. 2B illustrates a schematic diagram of another example encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
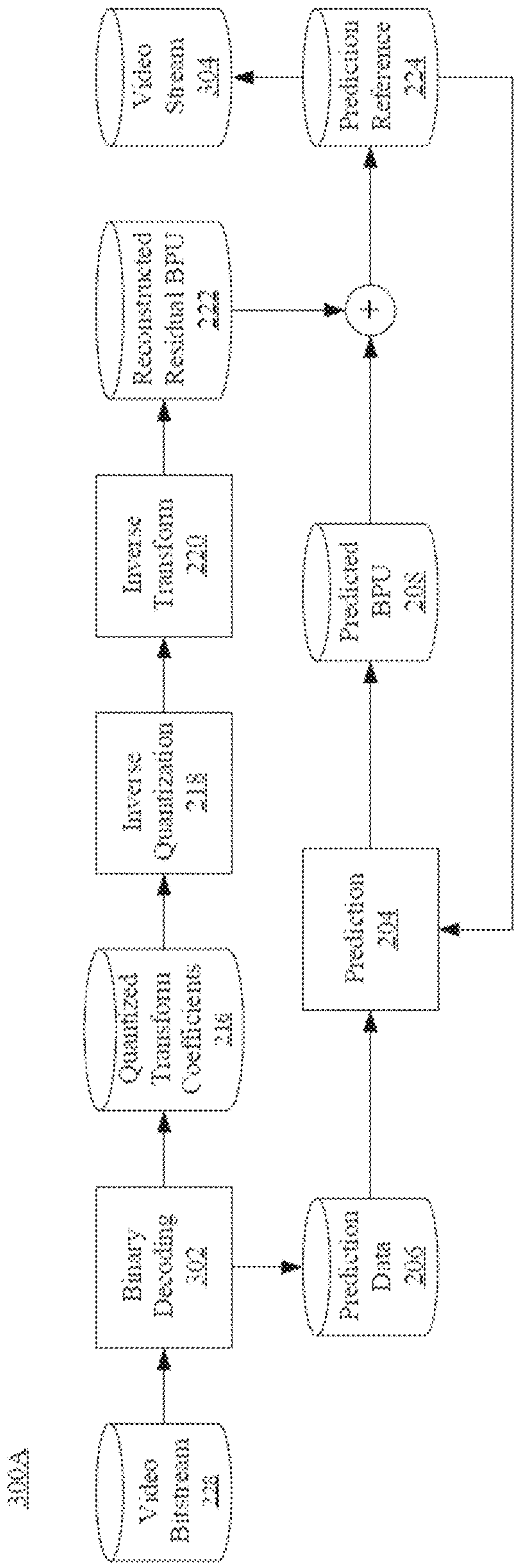
FIG. 3A illustrates a schematic diagram of an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
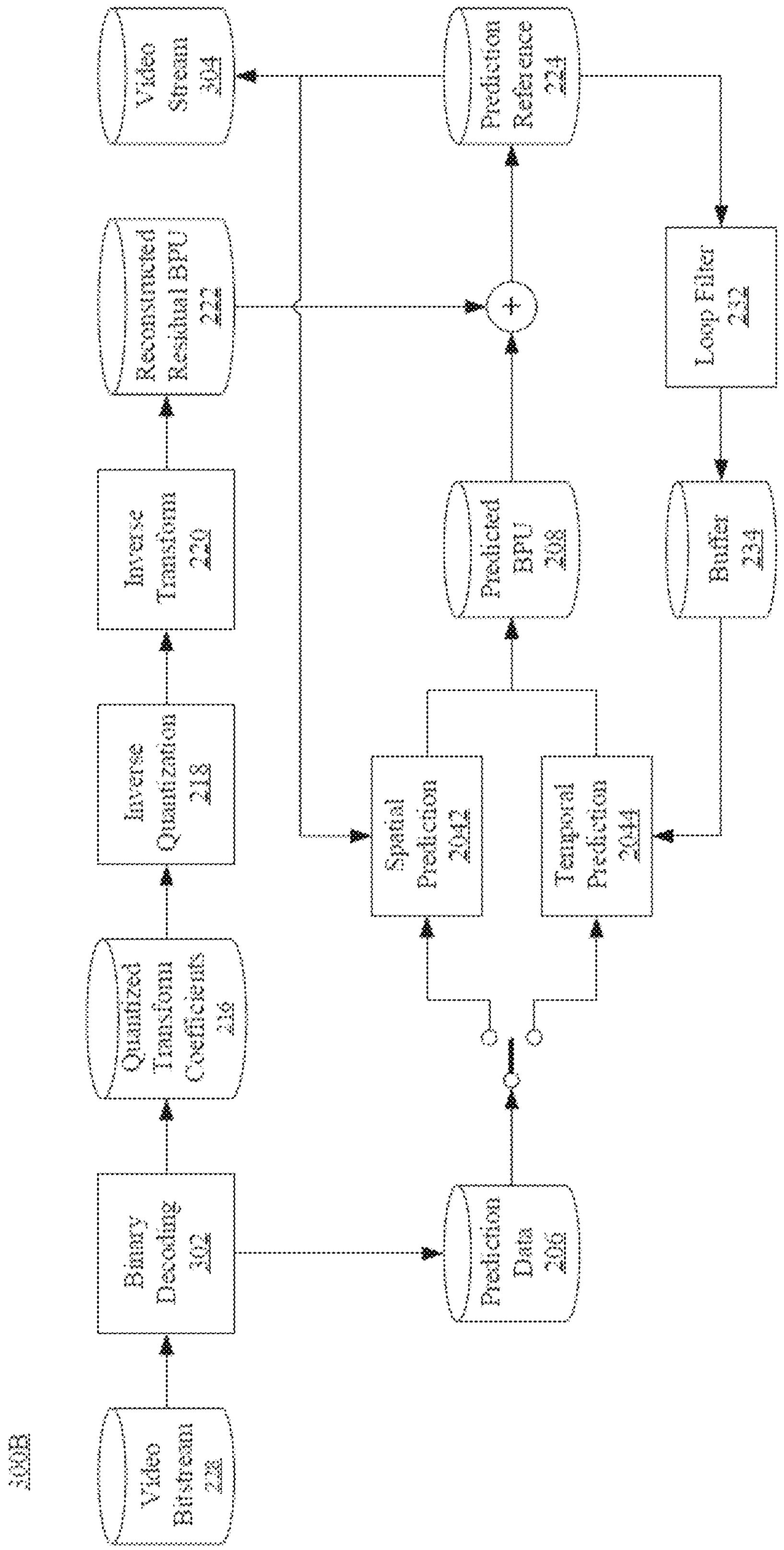
FIG. 3B illustrates a schematic diagram of another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
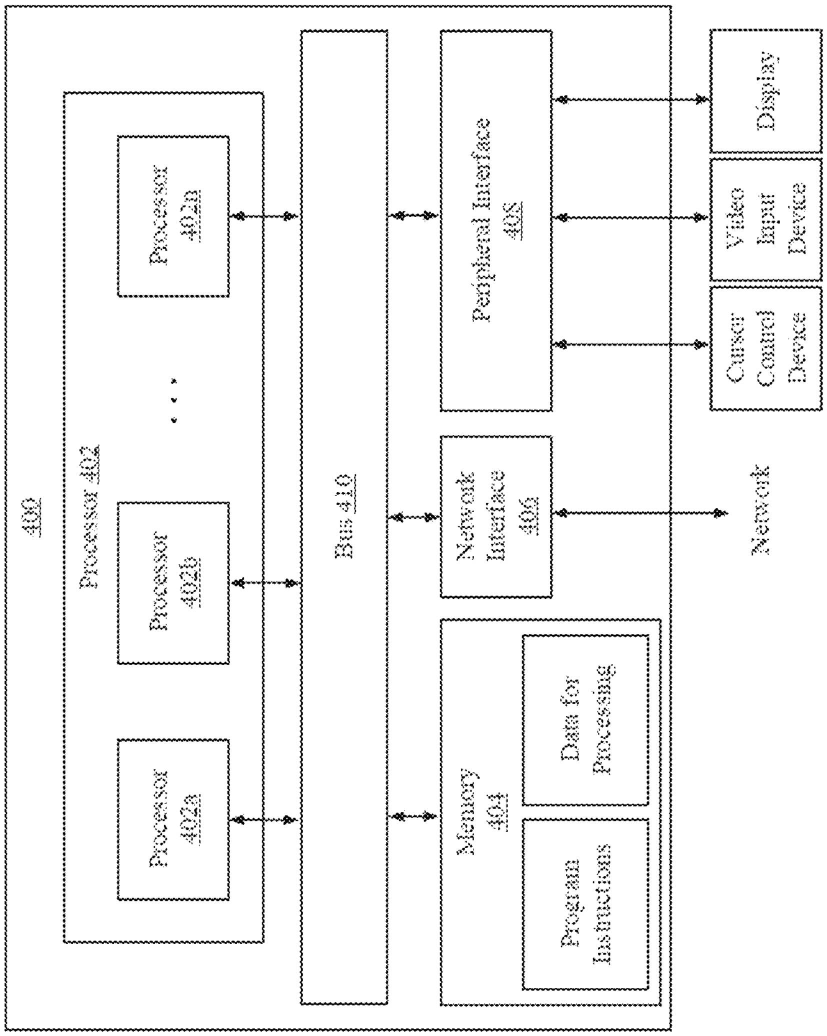
FIG. 4 is a block diagram of an exemplary apparatus for encoding or decoding a video, consistent with embodiments of the disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402*a*, processor 402*b*, and processor 402*n*.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The present disclosure provides methods for refining the motion information (e.g., motion vectors) used in the above-described encoding or decoding process 200A, 200B, 300A, or 300B.

Figure 5:
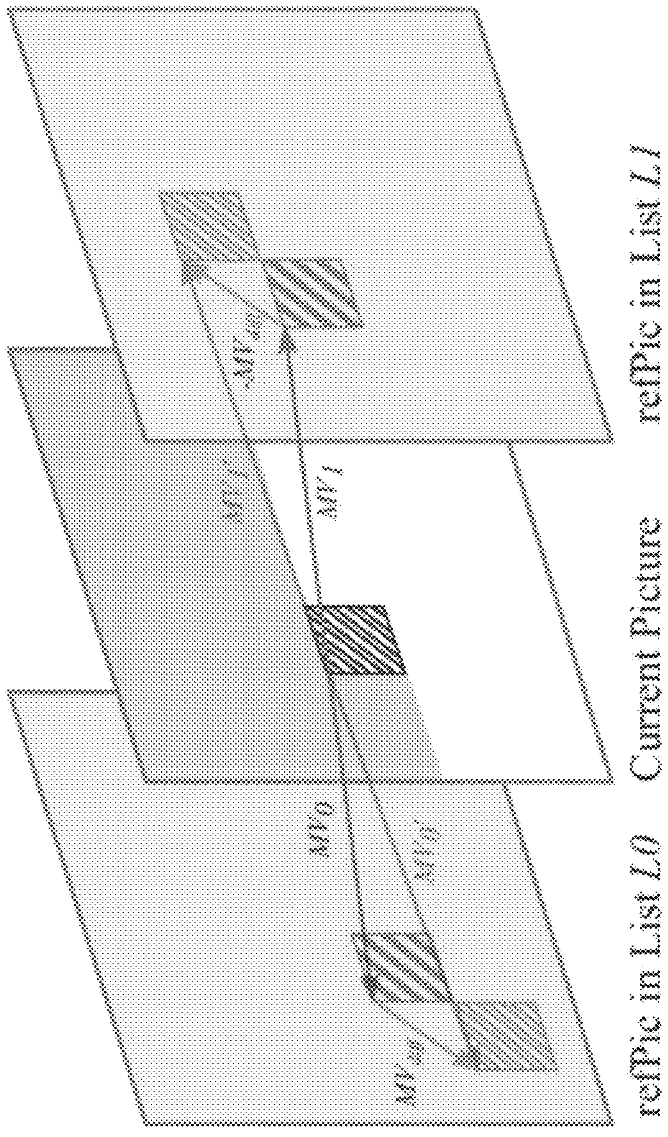
FIG. 5 illustrates an exemplary decoding-side motion vector refinement (DMVR) process, according to some embodiments of the present disclosure.

Next, decoder-side motion vector refinement (DMVR) is described. VVC adopts a bilateral-matching (BM) based decoder side motion vector refinement in bi-prediction operation to increase the accuracy of the MVs of the merge mode. In DMVR, refined MVs are searched around the initial MVs in the reference picture list L0 and reference picture list L1. The BM method calculates the distortion between the two candidate blocks in the reference picture list L0 and reference picture list L1. As illustrated in FIG. 5, the sum of absolute difference (SAD) between the motion vector candidates $MV_0'$, $MV_1'$ around the initial $MV_0$, $MV_1$ is calculated. The MV candidates with the lowest SAD become the refined MVs and used to generate the bi-predicted signal.

In VVC, the application of DMVR is restricted and is only applied for the CUS that are coded with some or all of the following modes and features:

- CU level merge mode with bi-prediction MV
- One reference picture is in the past and another reference picture is in the future with respect to the current picture
- The distances (i.e., POC difference) from two reference pictures to the current picture are same
- Both reference pictures are short-term reference pictures
- CU has more than 64 luma samples
- Both CU height and CU width are larger than or equal to 8 luma samples
- BCW weight index indicates equal weight
- WP is not enabled for the current block
- CIIP mode is not used for the current block The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

In DMVR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + \text{MV\_offset} \quad (1)$$

$$MV1' = MV1 - \text{MV\_offset} \quad (2)$$

where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by 1/4 of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x, y) = A(x - x_{min})^2 + B(y - y_{min})^2 + C \quad (3)$$

where $(x_{min}, y_{min})$ corresponds to the fractional position with the least cost and C corresponds to the minimum cost value. By solving the above equations by using the cost value of the five search points, the $(x_{min})$ $y_{min})$ is computed as:

$$x_{min} = (E(-1, 0) - E(1, 0))/(2(E(-1, 0) + E(1, 0) - 2E(0, 0))) \quad (4)$$

$$y_{min} = (E(0, -1) - E(0, 1))/(2((E(0, -1) + E(0, 1) - 2E(0, 0))) \quad (5)$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

Next, bilinear-interpolation and sample padding is described. In VVC, the resolution of the MVs is 1/16 luma samples. The samples at the fractional position are interpolated using an 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DMVR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

When the width or height of a CU are larger than 16 luma samples, it will be further split into subblocks with width or height equal to 16 luma samples. The maximum unit size for DMVR searching process is limited to 16×16.

Next, multi-pass decoder-side motion vector refinement (MP-DMVR) is described. In ECM, to further improve the coding efficiency, a multi-pass decoder-side motion vector refinement is applied. In the first pass, bilateral matching (BM) is applied to the coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8 or other values. For example, as in FIG. 6, point 0 is the position to which the initial MV refers. So, the points 1 to 8 surrounding the initial position is searched first and the cost of each position is calculated. If point 7 is with minimum cost, then point 7 is set as search center and points 9, 10 and 11 are searched. If cost of point 10 is smaller than the point 7, the search center goes to point 10 and points 12, 13 and 14 are searched. If point 12 is with minimum cost among points 6 to 14, point 12 is set as new search center. If points 10, 11, 13, 15 to 19 surrounding the point 10 are all larger than point 10, then point 12 is the best position and the search process stops.

The bilateral matching cost is calculated as: bilCost=mvDistanceCost+sadCost, wherein sadCost is the SAD between 10 predictor and 11 predictor on each search point and mvDistanceCost is based on intDeltaMV (i.e., the distance between the search point and the initial position). When the block size cbW×cbH is greater than 64, MRSAD cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

$$MV0\_pass1 = MV0 + \text{delta}MV \tag{6}$$

$$MV1\_pass1 = MV1 - \text{delta}MV \tag{7}$$

In the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2 (sbIdx2) and MV1_pass2 (sbIdx2)) are derived based on the minimum bilateral matching cost between the two reference subblocks in L0 and L1.

For each subblock, BM performs full search to derive integer sample precision intDeltaMV (sbIdx2). The full search has a search range [−sHor, sHor] in horizontal direction and [−sVer, sVer] in vertical direction, wherein, the values of sHor and sVer are determined by the block dimension, and the maximum value of sHor and sVer is 8 or other values.

Figure 7:
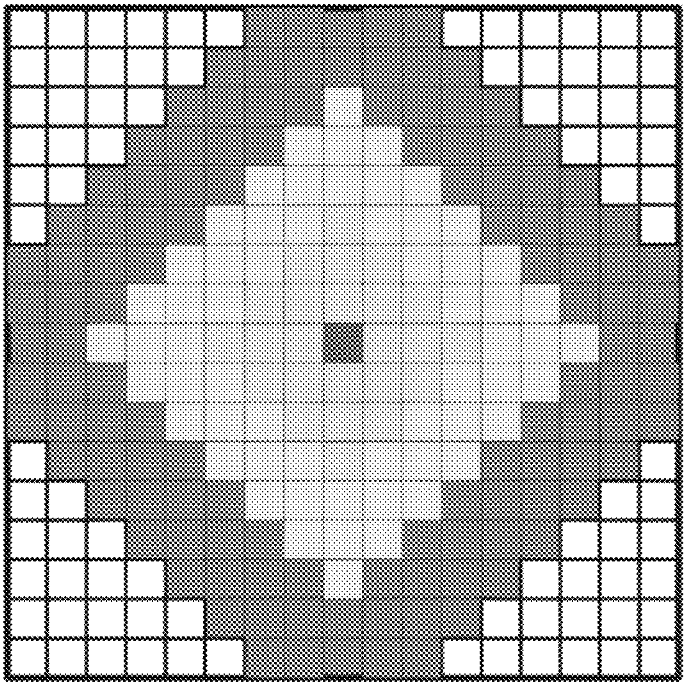
FIG. 7 illustrates diamond regions in a search area for decoder-side motion vector refinement (DMVR), according to some embodiments of the present disclosure.

The bilateral matching cost is calculated by applying a cost factor to the SATD cost between two reference subblocks, as: bilCost=satdCost×costFactor. The search area (2×sHor+1)×(2×sVer+1) is divided up to 5 diamond shape search regions shown on FIG. 7. Each search region is assigned a costFactor, which is determined by the distance intDeltaMV (sbIdx2) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW×sbH, the int-pel full search is terminated, otherwise, the int-pel full search continues to the next search region until all search points are examined. Additionally, if the difference between the previous minimum cost and the current minimum cost in the iteration is less than a threshold that is equal to the area of the block, the search process terminates.

The existing VVC DMVR fractional sample refinement is further applied to derive the final deltaMV(sbIdx2). The refined MVs at second pass is then derived as:

$$MV0\_pass2(sbIdx2) = MV0\_pass1 + deltaMV(sbIdx2) \tag{8}$$

$$MV1\_pass2(sbIdx2) = MV1\_pass1 - deltaMV(sbIdx2) \tag{9}$$

In the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32.

The refined MVs (MV0_pass3(sbIdx3) and MV1_pass3 (sbIdx3)) at third pass are derived as:

$$MV0\_pass3(sbIdx3) = MV0\_pass2(sbIdx2) + bioMv \tag{10}$$

$$MV1\_pass3(sbIdx3) = MV0\_pass2(sbIdx2) - bioMv \tag{11}$$

In ECM, adaptive decoder side motion vector refinement method is an extension of multi-pass DMVR which consists of the two new merge modes to refine MV only in one direction, either L0 or L1, of the bi prediction for the merge candidates that meet the DMVR conditions. The multi-pass DMVR process is applied for the selected merge candidate to refine the motion vectors, however either MVD0 or MVD1 is set to zero in the 1st pass (i.e., PU level) DMVR. Thus, a new merge candidate list is constructed for adaptive decoder-side motion vector refinement. And the new merge mode for the new merge candidate list is called BM merge in ECM.

The merge candidates for BM merge mode are derived from spatial neighboring coded blocks, TMVPs, non-adjacent blocks, history-based motion vector predictors (HMVPs), pair-wise candidate, similar to the derivation process in the regular merge mode. The difference is that only those meeting the DMVR conditions are added into the candidate list. The same merge candidate list is used by the two new merge modes. If the list of BM candidates contains the inherited BCW weights and DMVR process is unchanged except the computation of the distortion is made using MRSAD or MRSATD if the weights are non-equal and the bi-prediction is weighted with BCW weights. Merge index is coded as in regular merge mode.

Figure 8:
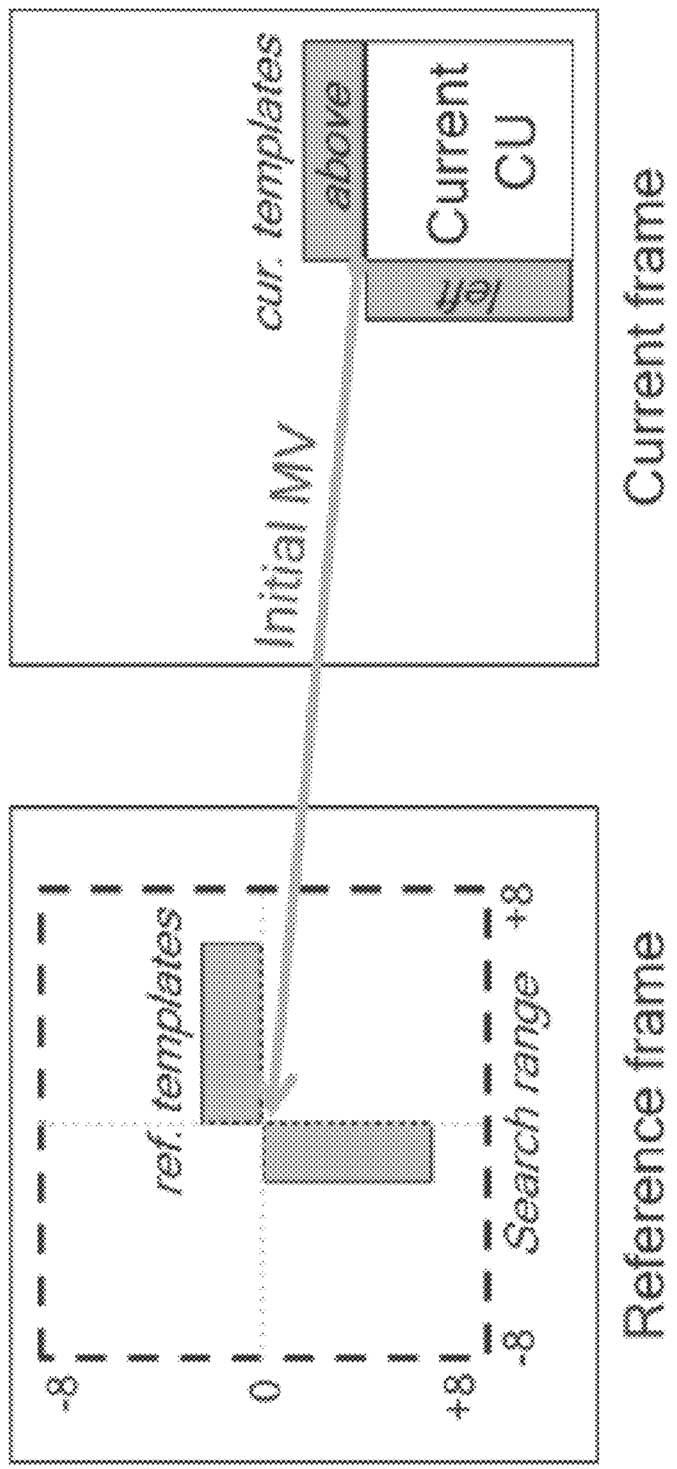
FIG. 8 illustrates template matching performed on a search area around initial motion vector (MV), according to some embodiments of the present disclosure.

Template matching (TM) is a decoder-side MV derivation method to refine the motion information of the current CU by finding the closest match between a template (i.e., top or left neighboring blocks of the current CU) in the current picture and a block (i.e., same size to the template) in a reference picture. FIG. 8 illustrates template matching performed on a search area around an initial motion vector (MV), according to some embodiments of the present disclosure. As illustrated in FIG. 8, a refined MV is searched around the initial motion of the current CU within a [−8, +8]-pel search range. Deriving motion information may include finding the closest match between the current templates (in above or left neighboring blocks of the current CU) in the current picture and the reference templates (e.g., reference templates with the same sizes as the corresponding current templates) in the reference frame. To efficiently combine with adaptive motion vector resolution (AMVR) and decoder side motion vector refinement (DMVR), the search step size of TM can be determined based on AMVR mode and TM can be cascaded with DMVR process in merge modes.

In advanced motion vector prediction (AMVP) mode, an MVP candidate is determined based on template matching error to select the one which reaches the minimum cost. The cost is calculated as the difference between the current block template and the reference block template. And then TM is performed only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1. This search process ensures that the MVP candidate still keeps the same MV precision as indicated by the AMVR mode after TM process. In the search process, if the difference between the previous minimum cost and the current minimum cost in the iteration is less than a threshold that is equal to the area of the block, the search process terminates.

TABLE 1

Search patterns of AMVR and merge mode with AMVR

| Search pattern | AMVR mode 4-pel | Full-pel | Half-pel | Quarter-pel | Merge mode AltIF = 0 | AltIF = 1 |
|---|---|---|---|---|---|---|
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

In merge mode, similar search method is applied to the merge candidate indicated by the merge index. As Table 1 shows, TM may perform all the way down to ⅛-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

Figure 9B:
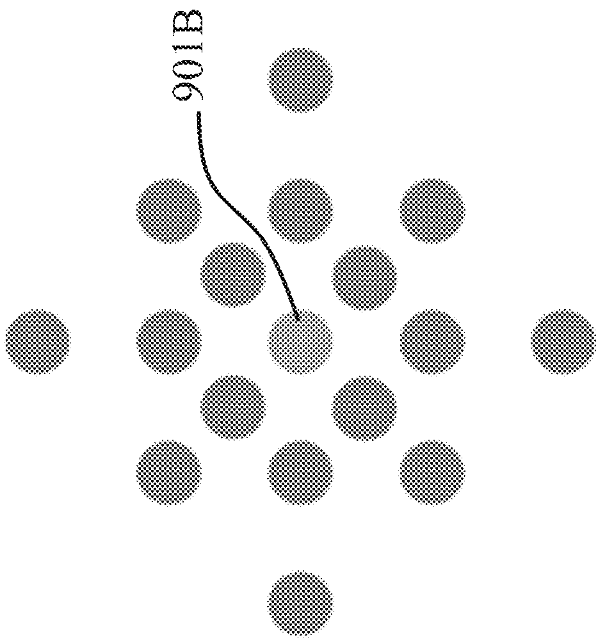
FIG. 9B illustrates a 16-position diamond search pattern, according to some embodiments of the present disclosure.
Figure 9A:
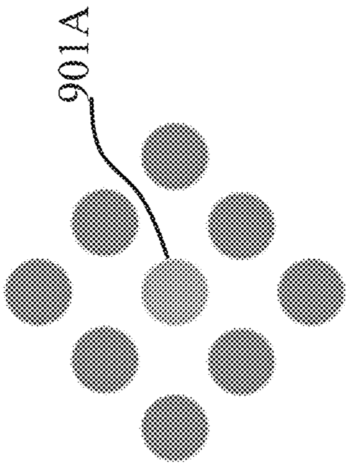
FIG. 9A illustrates an 8-position diamond search pattern, according to some embodiments of the present disclosure.

FIG. 9A and FIG. 9B illustrate the diamond search patterns. FIG. 9A is an 8-position diamond search pattern. In each search round, the current position 901A is set as the search center and the 8 neighboring positions around the current position 901A are checked, of which the position yielding the minimum cost is selected as the next search center. FIG. 9B is 16-position diamond search pattern. In each search round, the current position 901B is set as the search center and the 16 neighboring positions around the current position 901B are checked, of which the position yielding the minimum cost is selected as the next search center. The search process is performed iteratively until it reaches a maximum search round number preset or the search position is over the search range. The early termination algorithm can be adopted. for example, in a search round, if the search center has the minimum cost, the search is terminated.

The sum of absolute difference (SAD) or the sum of absolute transformed difference (SATD) between templates of the current block and the reference block may be used as the template matching cost, i.e., the cost of a candidate motion vector which refers to the reference block. In some other cases, mean removed SAD or mean removed SATD may be used as the template matching cost. The template matching cost is calculated as the difference between the template of the current block and the template of the reference block.

Figure 10:
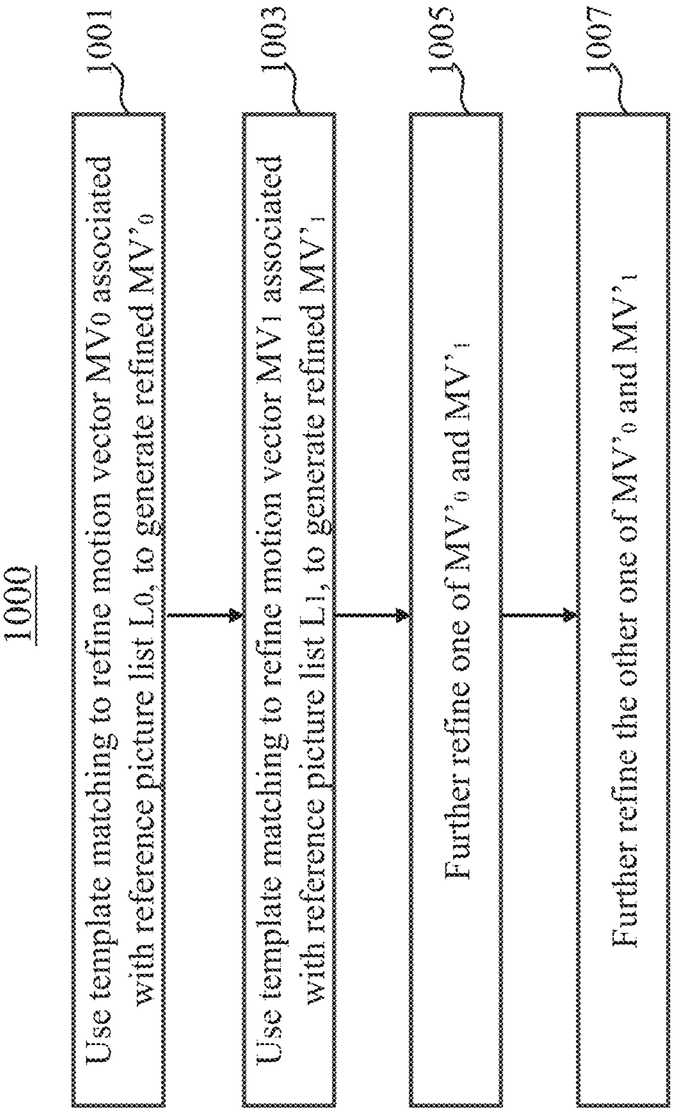
FIG. 10 is a flowchart of a process of template-based refinement for bi-prediction coding blocks.

For bi-prediction candidate, the two MVs, one for reference picture list 0 and the other for reference picture list 1, are firstly refined independently and then an iteration process is performed to jointly refine the two MVs. FIG. 10 is a flowchart of a process 1000 of template-based refinement for bi-prediction coding blocks, according to some embodiments of the present disclosure. As shown in FIG. 10, step 1001 involves refining the initial motion vector of list 0 ($MV_0$) using a template matching (TM) method. This refinement produces a refined motion vector ($MV'_0$) and a corresponding TM cost $C_0$. In step 1003, the process refines the initial motion vector of list 1 ($MV_1$) using the TM method. This step yields a refined motion vector ($MV'_1$) and a corresponding TM cost $C_1$. Step 1005 compares $C_0$ and $C_1$. If $C_0$ is larger than $C_1$, $MV'_1$ is fixed and used to derive a further refined MV of list 0 on top of $MV'_0$, considering the template obtained by $MV'_1$. The refined MV of list 0 in this step is denoted as $MV''_0$. Otherwise, $MV'_0$ is fixed and used to derive a further refined MV of list 1 on top of $MV'_1$, considering the template obtained by $MV'_0$. The refined MV of list 1 in this step is denoted as $MV''_1$. In step 1007, the process 1000 continues based on which MV was refined in step 1005. If the MV of list 0 was refined in step 1005, $MV''_0$ is fixed and used to derive the $MV''_1$ from $MV'_1$, considering the template obtained by $MV''_0$. Conversely, if the MV of list 1 was refined in step 1005, $MV''_1$ is fixed and used to derive the $MV''_0$ from $MV'_0$, considering the template obtained by $MV''_1$. The TM cost corresponding to $MV''_0$ and $MV''_1$ is obtained as CostBi. The process 1000 is an iterative refinement process for bi-prediction coding blocks, alternating between refining motion vectors for list 0 and list 1 based on template matching costs. In the disclosed embodiments, steps 1005 and 1007 may be iterated. In some embodiments, the cost of bi-prediction CostBi (generated in the process 1000) is compared with uni prediction cost $C_0$ or $C_1$. If MV of list 0 is refined in step 1007, CostBi is compared with $C_1$; and if MV of list 1 is refined in step 1007, CostBi is compared with $C_0$. If CostBi is larger than uni-prediction cost and the difference exceeds a predetermined amount, the current block is converted to a uni-prediction block.

Figure 11A:
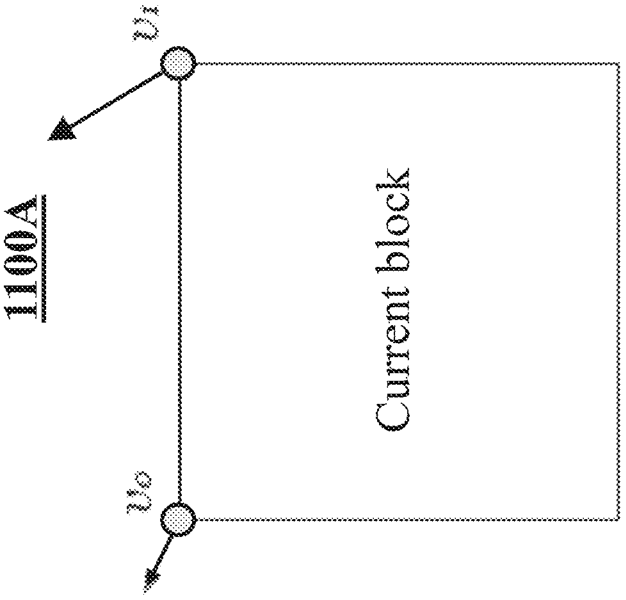
FIG. 11A illustrates a 4-parameter affine model, according to some embodiments of the present disclosure.
Figure 11B:
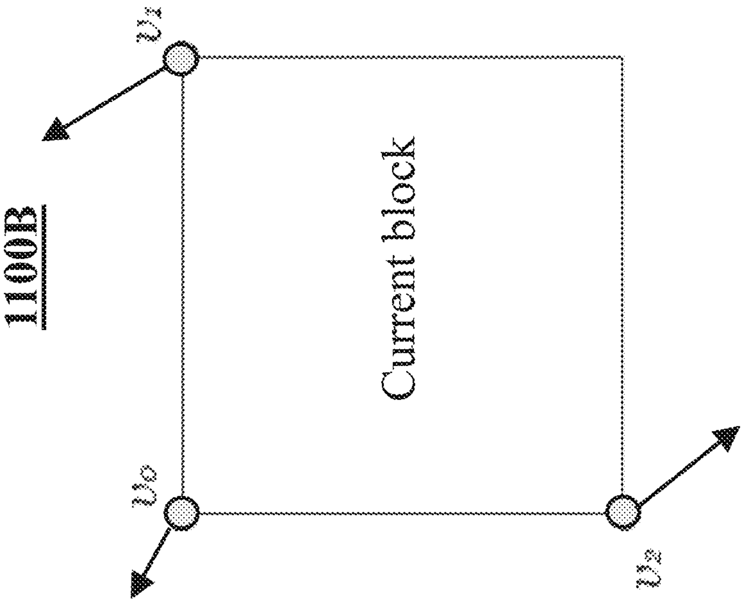
FIG. 11B illustrates a 6-parameter affine model, according to some embodiments of the present disclosure.

In HEVC, only translation motion model is applied for motion compensation prediction (MCP). While in the real world, there are many kinds of motion, e.g., zoom in/out, rotation, perspective motions and the other irregular motions. In VVC, a block-based affine transform motion compensation prediction is applied. For example, FIGS. 11A-11B illustrate control point based affine motion models. As shown, the affine motion field of the block can be described by motion information of two control point motion vectors (4-parameter affine model in FIG. 11A) or three control point motion vectors (6-parameter affine model in FIG. 11B).

For the 4-parameter affine motion model, motion vector at sample location (x, y) in a block is derived as:

$$\begin{cases} mv_x = \frac{mv_{1X} - mv_{0x}}{W}x + \frac{mv_{0y} - mv_{1y}}{W}y + mv_{0x} \\ mv_y = \frac{mv_{1y} - mv_{0y}}{W}x + \frac{mv_{1x} - mv_{0x}}{W}y + mv_{0y} \end{cases} \quad (12)$$

For the 6-parameter affine motion model, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad (13)$$

where $(mv_{0x}, mv_{0y})$ is motion vector of the top-left corner control point, $(mv_{1x}, mv_{1y})$ is motion vector of the top-right corner control point, and (mv2x, mv2y) is motion vector of the bottom-left corner control point.

Figure 12:
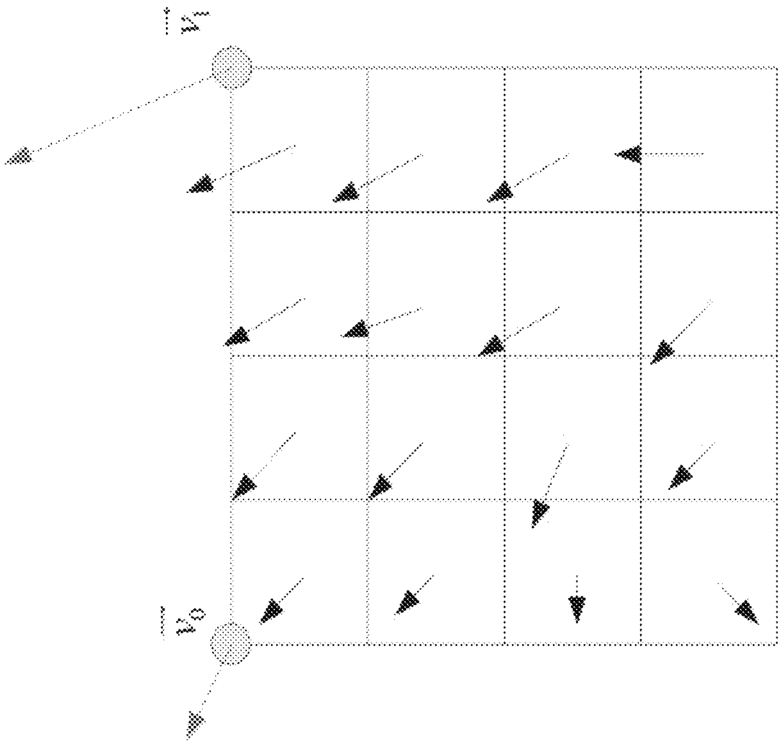
FIG. 12 illustrates affine motion vector field (MVF) per subblock, according to some embodiments of the present disclosure.

In order to simplify the motion compensation prediction, block based affine transform prediction is applied. To derive motion vector of each 4×4 luma subblock, the motion vector of the center sample of each subblock, as shown in FIG. 12, is calculated based on the above equations, and rounded to 1/16 fraction accuracy. In ECM, the subblock size is adaptively decided. If the motion vector difference of two neighboring luma subblock is smaller than a threshold, luma subblocks will be merged into larger subblocks. If the motion vector difference of the larger subblock is still smaller than the threshold, the larger subblock will continue to be merged until the motion vector difference of the two adjacent subblocks is larger than the threshold or until the subblock is equal to the coding unit. Then the motion compensation interpolation filters are applied to generate the prediction of each subblock with derived motion vector. The subblock size of chroma-components is dependent on the size of luma subblock. The MV of a chroma subblock is calculated as the average of the MVs of the top-left and bottom-right luma subblocks in the collocated luma region.

As done for translational motion inter prediction, there are also two affine motion inter prediction modes: affine merge mode and affine AMVP mode.

Figure 13:
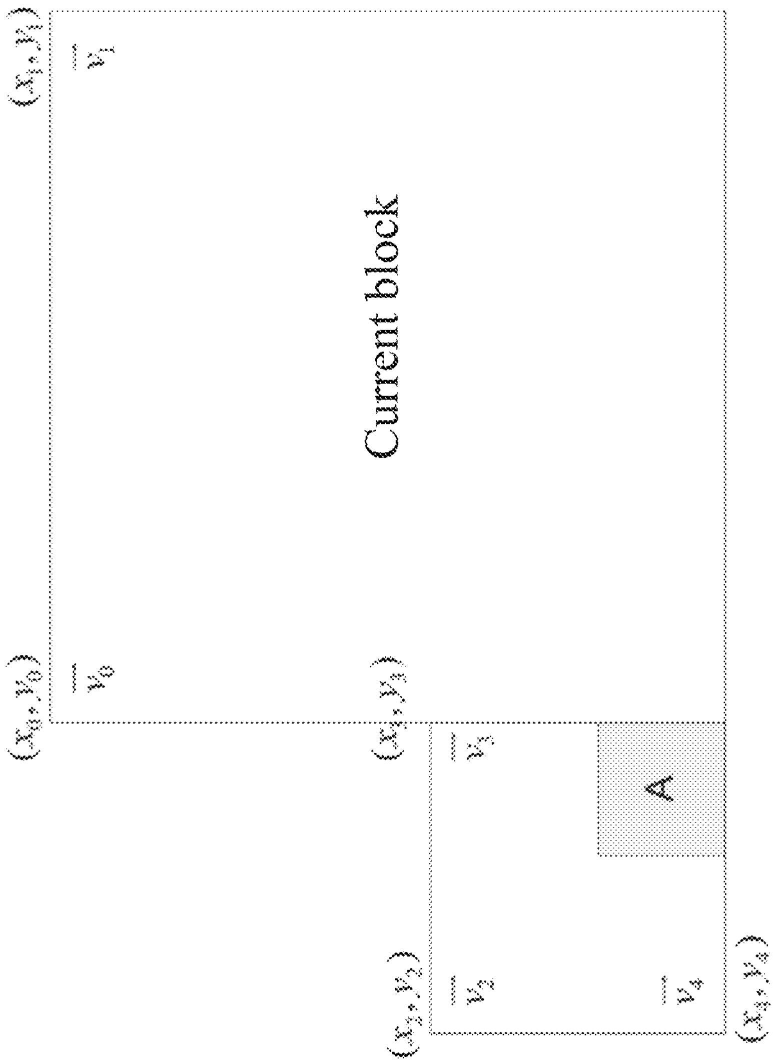
FIG. 13 illustrates control point motion vector inheritance, according to some embodiments of the present disclosure.

Affine merge mode (AF_MERGE) can be applied for CUs with both width and height larger than or equal to 8. In this mode the control point motion vectors (CPMVs) of the current CU is generated based on the motion information of the spatial neighboring CUs. There can be up to 15 affine candidates and an index is signaled to indicate the one to be used for the current CU. The following 8 types of candidates are used to form the affine merge candidate list:

- Inherited candidates from adjacent neighbors
- Inherited candidates from non-adjacent neighbors
- Constructed candidates from adjacent neighbors
- The second type of constructed affine candidates from non-adjacent neighbors
- The first type of constructed affine candidates from non-adjacent neighbors
- Regression based affine merge candidate
- Pairwise affine
- Zero MVs The inherited affine candidates are derived from affine motion model of the adjacent or non-adjacent blocks. When an adjacent or non-adjacent affine CU is identified, its control point motion vectors are used to derive the CPMVP candidate in the affine merge list of the current CU. As shown in FIG. 13, if the neighboring left bottom block A is coded in affine mode, the motion vectors $v_2$, $v_3$ and $v_4$ of the top left corner, above right corner and left bottom corner of the CU that contains block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

For inherited candidate from non-adjacent neighbors. The non-adjacent spatial neighbors are checked based on their distances to the current block, i.e., from near to far. At a specific distance, only the first available neighbor (that is coded with the affine mode) from each side (e.g., the left and above) of the current block is included for inherited candidate derivation. FIG. 14A illustrates a method for deriving inherited affine merge/AMVP candidates, according to some embodiments of the present disclosure. As shown in FIG. 14A, the current coding unit is marked as "Cur". As indicated by the dash arrows in FIG. 14A the checking orders of the neighbors on the left and above sides are bottom-to-up and right-to-left, respectively.

Figure 15:
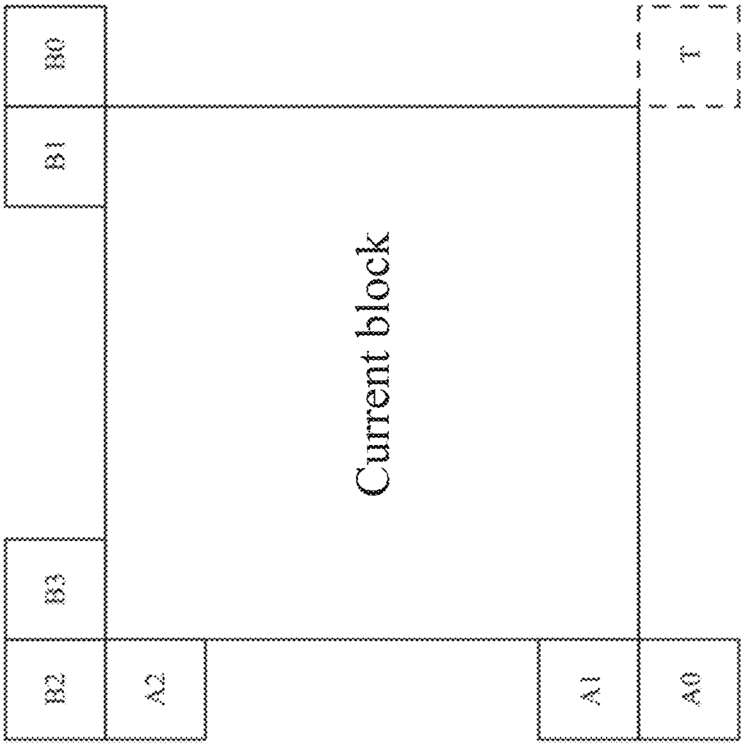
FIG. 15 illustrates locations of candidates position for constructed affine merge mode, according to some embodiments of the present disclosure.

Constructed affine candidates from adjacent neighbors are the candidates constructed by combining the neighbor translational motion information of each control point. The motion information for the control points is derived from the specified spatial neighbors and temporal neighbor shown in FIG. 15. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. For TMVP is used as $CPMV_4$ if it's available.

After MVs of four control points are attained, affine merge candidates are constructed based on those motion information. The following combinations of control point MVs are used to construct in order:

$\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, $\{CPMV_1, CPMV_3\}$

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

Figure 14B:
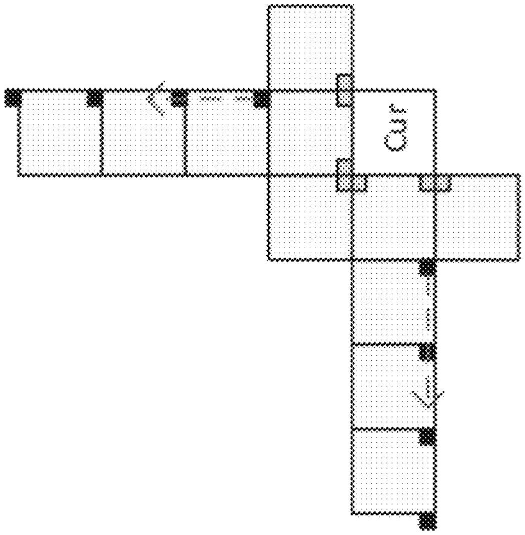
FIG. 14A and FIG. 14B illustrate spatial neighbors for deriving affine merge or advanced motion vector prediction (AMVP) candidates, according to some embodiments of the present disclosure.
Figure 14A:
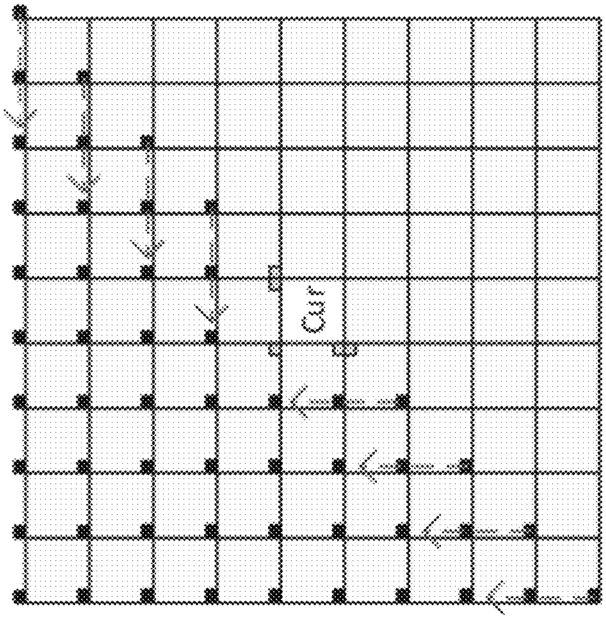
Figure 16:
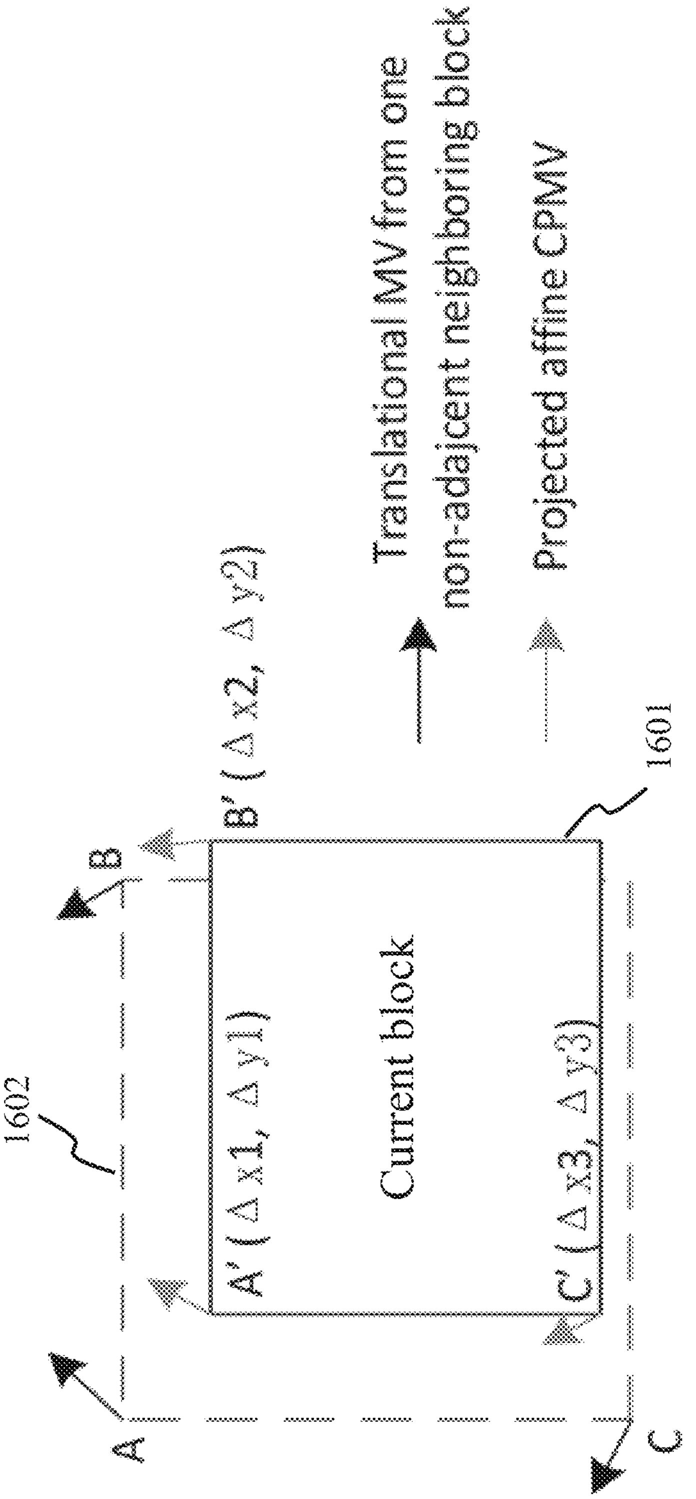
FIG. 16 illustrates 6-parameter affine merge/AMVP candidates constructed based on a combination of 3 control point motion vectors (CPMVs), according to some embodiments of the present disclosure.

FIG. 14B illustrates a method for deriving 6-parameter affine merge/AMVP candidates constructed based on a combination of 3 CPMVs, according to some embodiments of the present disclosure. As shown in FIG. 14B, the positions of a left non-adjacent spatial neighbor and an above non-adjacent spatial neighbor of a current coding unit (marked as "Cur" in FIG. 14B) are first determined independently. After that, as shown in FIG. 16, the location of the top-left neighbor can be determined according to the locations of the left and the above non-adjacent spatial neighbors, such that the left, above, and top-left spatial neighbors can collectively define a rectangular virtual block 1602. Then, as shown in the FIG. 16, the motion information of the three non-adjacent neighbors is used to form the CPMVs at the top-left (A), top-right (B) and bottom-left (C) of the virtual block, which is finally projected to the current coding unit to generate the corresponding constructed candidates.

For the 4-parameter affine merge/AMVP candidates constructed based on a combination of 2 CPMVs, the non-translational affine parameters are inherited from the non-adjacent spatial neighbors. Specifically, the 4-parameter affine merge/AMVP candidates are generated from the combination of 1) the translational affine parameters of adjacent neighboring 4×4 blocks; and 2) the non-translational affine parameters inherited from the non-adjacent spatial neighbors as defined in FIG. 14A.

Figure 17:
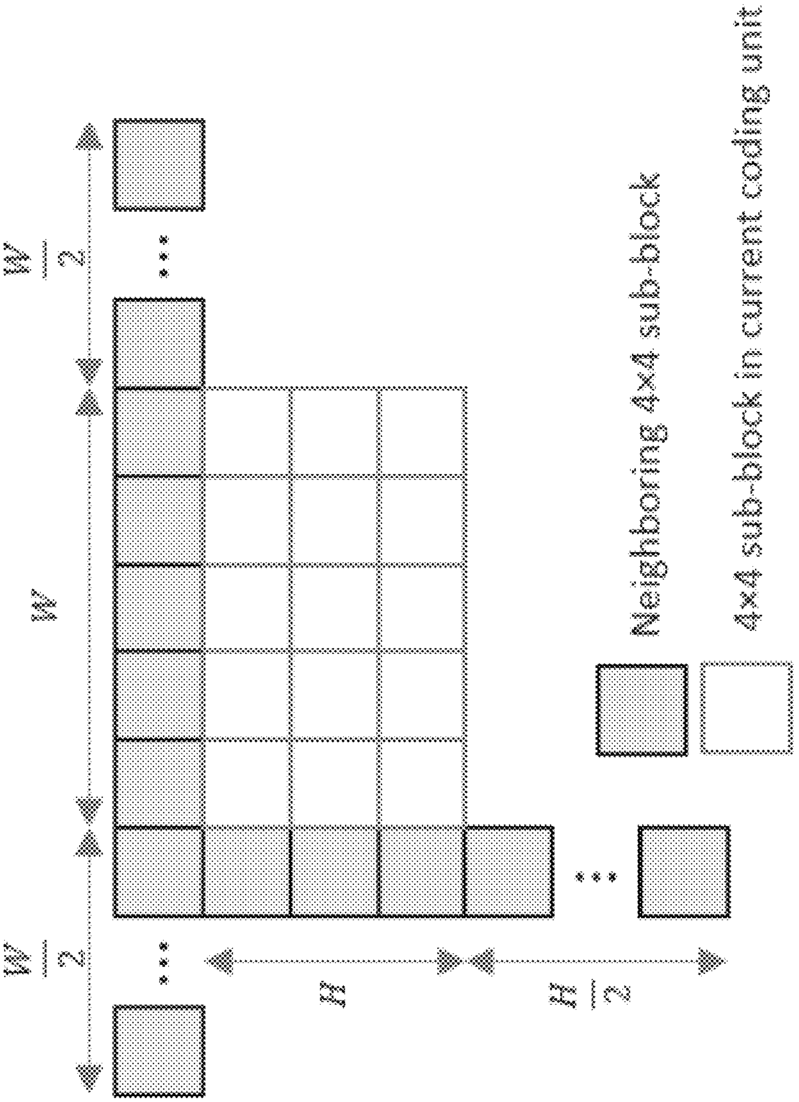
FIG. 17 illustrates neighboring 4×4 subblocks that are used for regression based affine merge candidate derivation, according to some embodiments of the present disclosure.

For the regression based affine merge candidates, sub-block motion field from a previously coded affine CU and motion information from adjacent subblocks of a current CU are used as the input to the regression process to derive proposed affine candidates. The previously coded affine CU can be identified from scanning through non-adjacent positions and the affine HMVP table. Adjacent subblock information of current CU is fetched from 4×4 sub-blocks represented by the grey filled zone depicted in FIG. 17. For each sub-block, given a reference list, the corresponding motion vector and center coordinate of the sub-block may be used. For each affine CU, up to 2 regression based affine candidates can be derived. One with adjacent subblock information and one without. All the linear-regression-generated candidates are pruned and collected into one candidate sub-group. TM cost based ARMC process is applied when ARMC is enabled. Afterwards, up to N linear-regression-generated candidates are added to the affine merge list when N affine CUs are found.

After inserting all the above candidates into the candidate list, if the list is still not full, zero MVs are inserted to the end of the list.

In the disclosed embodiments, prediction refinement with optical flow for affine mode can be used. Subblock based affine motion compensation can save memory access bandwidth and reduce computation complexity compared to pixel-based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1) The subblock-based affine motion compensation is performed to generate subblock prediction I(i, j).

Step 2) The spatial gradients $g_x(i, j)$ and $g_y(i,j)$ of the subblock prediction are calculated at each sample location using a 3-tap filter [−1, 0, 1]. The gradient calculation is exactly the same as gradient calculation in BDOF.

$$g_x(i, j) = (I(i+1, j) \gg \text{shift1}) - (I(i-1, j) \gg \text{shift1}) \quad (14)$$

$$g_y(i, j) = (I(i, j+1) \gg \text{shift1}) - (I(i, j-1) \gg \text{shift1}) \quad (15)$$

shift1 is used to control the gradient's precision. The sub-block (i.e., 4×4) prediction is extended by one sample on each side for the gradient calculation. To avoid additional memory bandwidth and additional interpolation computation, those extended samples on the extended borders are copied from the nearest integer pixel position in the reference picture.

Figure 18:
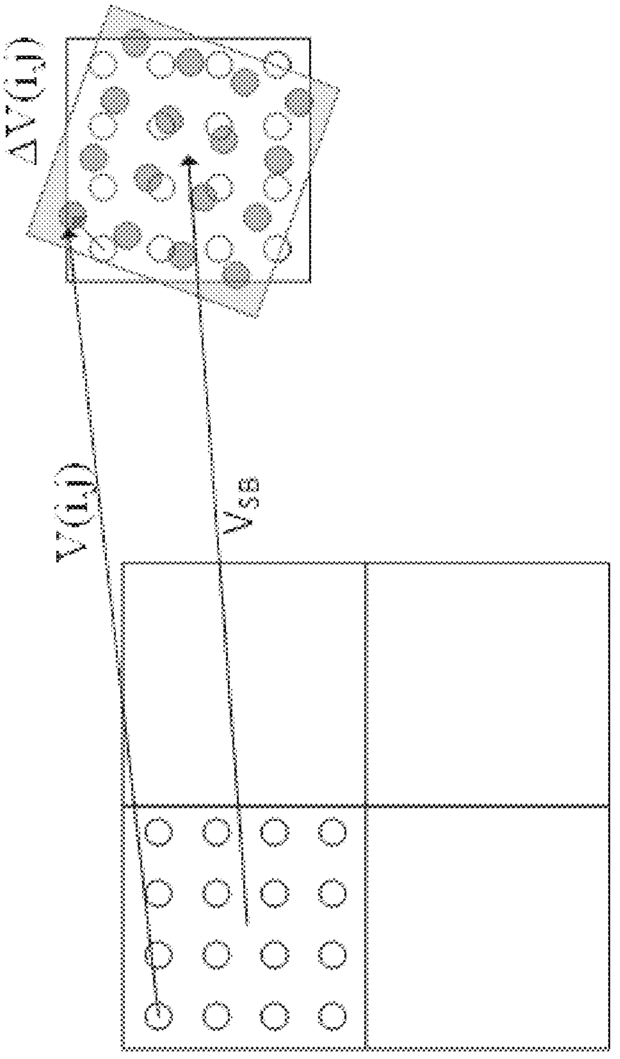
FIG. 18 illustrates subblock MV $V_{SB}$ and pixel $\Delta v(i, j)$, according to some embodiments of the present disclosure.

Step 3) The luma prediction refinement is calculated by the following optical flow equation.

$$\Delta I(i, j) = g_x(i, j) * \Delta v_x(i, j) + g_y(i, j) * \Delta v_y(i, j) \quad (16)$$

where the Δv(i, j) is the difference between sample MV computed for sample location (i,j), denoted by v(i,j), and the subblock MV of the subblock to which sample (i,j) belongs, as shown in FIG. 18. The Δv(i,j) is quantized in the unit of 1/32 luma sample precision.

Since the affine model parameters and the sample location relative to the subblock center are not changed from sub-block to subblock, Δv(i,j) can be calculated for the first subblock, and reused for other subblocks in the same CU. Let dx(i,j) and dy(i,j) be the horizontal and vertical offset from the sample location (i,j) to the center of the subblock ($x_{SB}$, $y_{SB}$), Δv(x, y) can be derived by the following equations:

$$\begin{cases} dx(i, j) = i - x_{SB} \\ dy(i, j) = j - y_{SB} \end{cases} \quad (17)$$

$$\begin{cases} \Delta v_x(i, j) = C * dx(i, j) + D * dy(i, j) \\ \Delta v_y(i, j) = E * dx(i, j) + F * dy(i, j) \end{cases} \quad (18)$$

In order to keep accuracy, the center of the subblock ($x_{SB}$, $y_{SB}$) is calculated as ((WSB−1)/2, (HSB−1)/2), where WSB and HSB are the subblock width and height, respectively. For 4-parameter affine model, it satisfies:

$$\begin{cases} C = F = \dfrac{v_{1x} - v_{0x}}{w} \\ E = -D = \dfrac{v_{1y} - v_{0y}}{w} \end{cases} \quad (19)$$

For 6-parameter affine model, it satisfies:

$$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \quad (20)$$

In the above equations (19) and (20), ($v_{0x}$, $v_{0y}$), ($v_{1x}$, $v_{1y}$), ($v_{2x}$, $v_{2y}$) are the top-left, top-right and bottom-left control point motion vectors, w and h are the width and height of the CU.

Step 4) Finally, the luma prediction refinement $\Delta I(i,j)$ is added to the subblock prediction I(i, j). The final prediction I' is generated as the following equation.

$$I'(i, j) = I(i, j) + \Delta I(i, j) \tag{21}$$

There are two cases in which the PROF is not applied to an affine coded CU: 1) all control point MVs are the same, which indicates the CU only has translational motion; and 2) the affine motion parameters are greater than a specified limit because the subblock based affine MC is degraded to CU based MC to avoid large memory access bandwidth requirement.

The merge candidates are adaptively reordered with template matching (TM). The reordering method is applied to regular merge mode, TM merge mode, and affine merge mode (excluding the SbTMVP candidate).

An initial merge candidate list is firstly constructed according to given checking order, such as spatial, temporal motion vector predictors (TMVPs), non-adjacent, history-based motion vector predictors (HMVPs), pairwise, virtual merge candidates. Then the candidates in the initial list are divided into several subgroups. Merge candidates in each subgroup are reordered to generate a reordered merge candidate list and the reordering is according to cost values based on template matching. The index of selected merge candidate in the reordered merge candidate list is signaled to the decoder. For simplification, merge candidates in the last but not the first subgroup are not reordered. All the zero candidates from the ARMC reordering process are excluded during the construction of Merge motion vector candidates list. The subgroup size is set to 5 for regular merge mode and TM merge mode. The subgroup size is set to 3 for affine merge mode.

Figure 19:
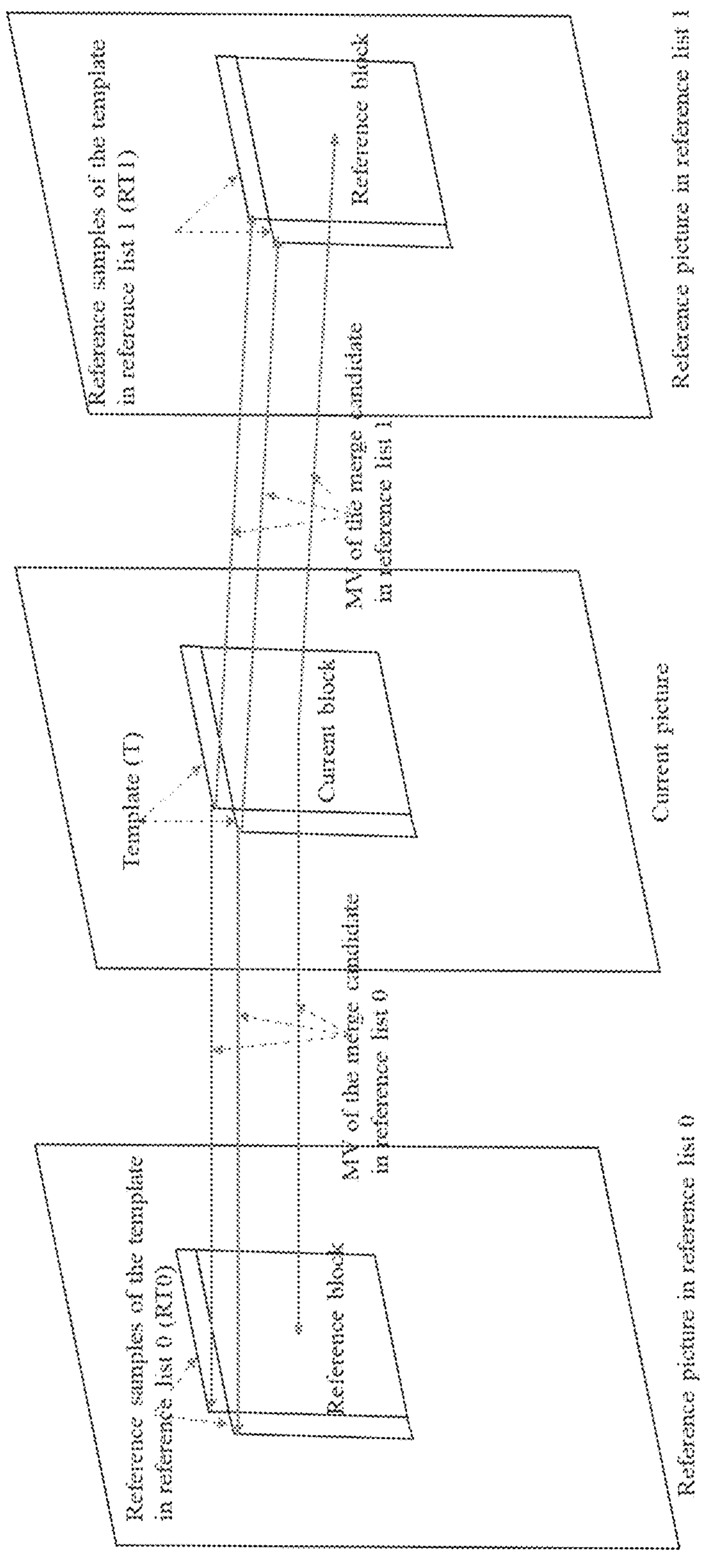
FIG. 19 illustrates template and reference samples of the template in reference pictures, according to some embodiments of the present disclosure.

The template matching cost of a merge candidate during the reordering process is measured by the SAD between samples of a template of the current block and their corresponding reference samples. FIG. 19 illustrates templates and their corresponding reference samples in reference pictures. As shown in FIG. 19, the template comprises a set of reconstructed samples neighboring to the current block. Reference samples of the template are located by the motion information of the merge candidate. When a merge candidate utilizes bi-directional prediction, the reference samples of the template of the merge candidate are also generated by bi-prediction.

When template matching is used to derive the refined motion, the template size is set equal to 1. Only the above or left template is used during the motion refinement of TM when the block is flat with block width greater than 2 times of height or narrow with height greater than 2 times of width. TM is extended to perform 1/16-pel MVD precision. The first four merge candidates are reordered with the refined motion in TM merge mode.

Figure 21:
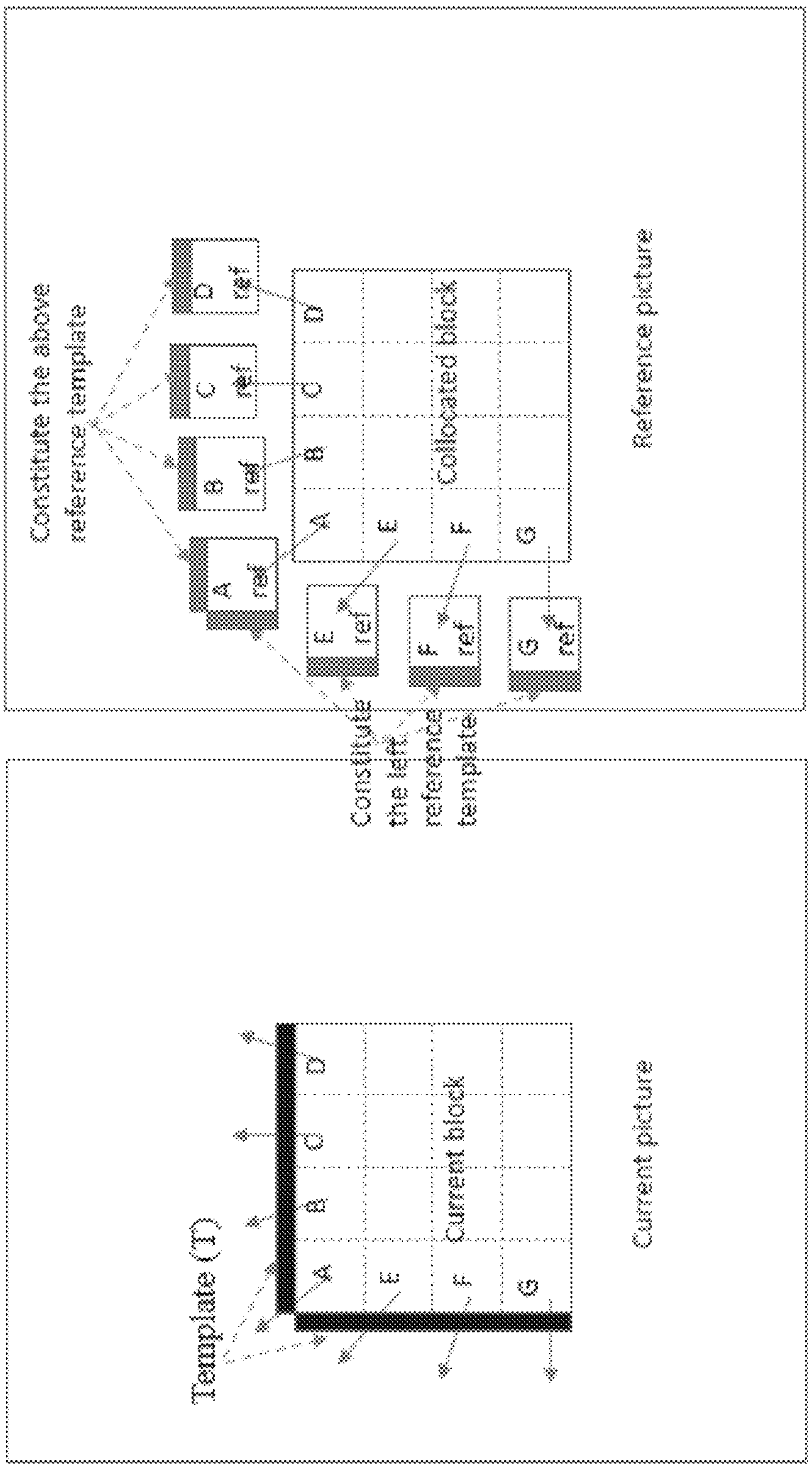
FIG. 21 illustrates template and reference samples of the template for block with sub-block motion using the motion information of the subblocks of the current block, according to some embodiments of the present disclosure.

For affine merge candidates with subblock size equal to Wsub×Hsub, the above template comprises several sub-templates with the size of Wsub×1, and the left template comprises several sub-templates with the size of 1×Hsub. As shown in FIG. 21, the motion information of the subblocks in the first row and the first column of current block is used to derive the reference samples of each sub-template.

In the reordering process, a candidate is considered as redundant if the cost difference between a candidate and its predecessor is inferior to a lambda value, e.g., $|D1-D2|<\lambda$, where D1 and D2 are the costs obtained during the first ARMC ordering and $\lambda$ is the Lagrangian parameter used in the RD criterion at encoder side.

The proposed algorithm is defined as the following:

- Determine the minimum cost difference between a candidate and its predecessor among all candidates in the list.
  - If the minimum cost difference is superior or equal to 2, the list is considered diverse enough and the reordering stops.
  - If this minimum cost difference is inferior to 2, the candidate is considered as redundant, and it is moved at a further position in the list. This further position is the first position where the candidate is diverse enough compared to its predecessor.
- The algorithm stops after a finite number of iterations (if the minimum cost difference is not inferior to $\lambda$).

This algorithm is applied to the Regular, TM, BM and Affine merge modes. A similar algorithm is applied to the Merge MMVD and sign MVD prediction methods which also use ARMC for the reordering.

The value of $\lambda$ is set equal to the $\lambda$ of the rate distortion criterion used to select the best merge candidate at the encoder side for low delay configuration and to the value $\lambda$ corresponding to a another QP for Random Access configuration. A set of $\lambda$ values corresponding to each signaled QP offset is provided in the SPS or in the Slice Header for the QP offsets which are not present in the SPS.

Figure 20:
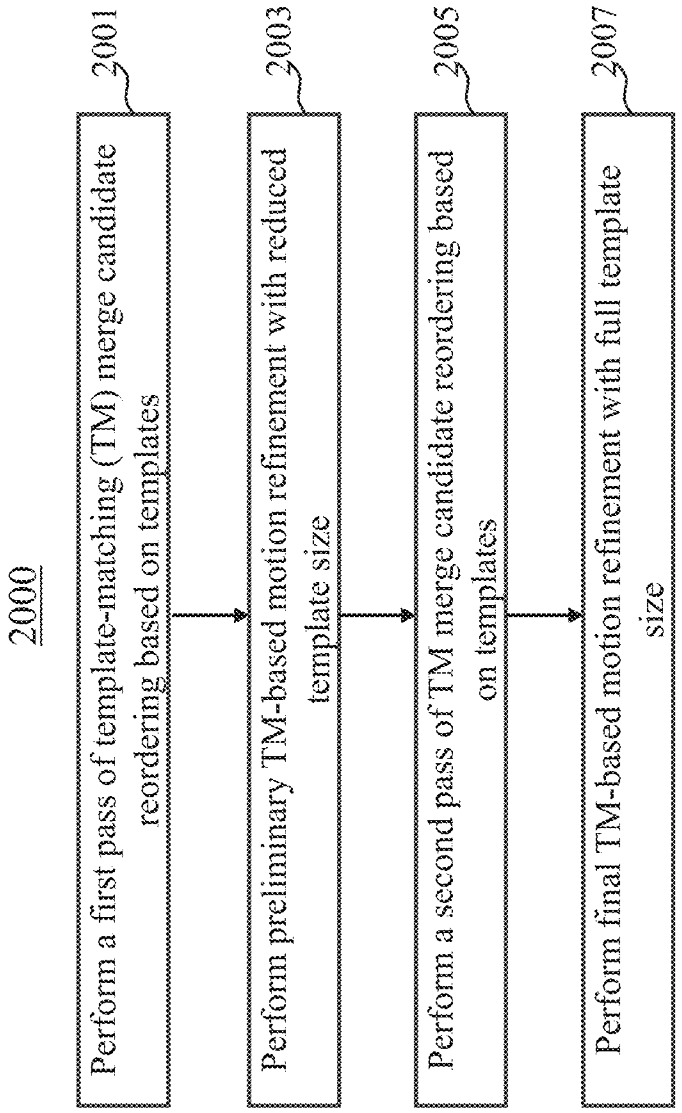
FIG. 20 is a flowchart of a process of template-based reordering and template-based motion refinement, according to some embodiments of the present disclosure.

The template-based reorder can also be applied in the TM merge mode. FIG. 20 is a flowchart of a process 2000 of template-based reordering and template-based motion refinement, according to some embodiments of the present disclosure. As shown in FIG. 20, at step 2001, the TM merge candidates are reordered before the TM refinement process. At step 2003, a preliminary TM based refinement is conducted with reduced size of template. At step 2005, another TM-based reordering is performed. At step 2007, the final TM based refinement is performed with full size template. In the preliminary TM based refinement, if multi-pass DMVR is used, only the first pass (i.e., PU level) of multi-pass DMVR is applied, and in the final TM based refinement, both PU level and subblock level of multi-pass DMVR are applied.

The ARMC design is also applicable to the AMVP mode wherein the AMVP candidates are reordered according to the TM cost. For the template matching for advanced motion vector prediction (TM-AMVP) mode, an initial AMVP candidate list is constructed, followed by a refinement from TM to construct a refined AMVP candidate list. In addition, an MVP candidate with a TM cost larger than a threshold, which is equal to five times of the cost of the first MVP candidate, is skipped.

It is noted that when wrap around motion compensation is enabled, the MV candidate is clipped with wrap around offset taken into consideration.

Merge candidates of one single candidate type, e.g., TMVP or non-adjacent MVP (NA-MVP), are reordered based on the ARMC TM cost values. The reordered candidates are then added into the merge candidate list. The TMVP candidate type adds more TMVP candidates with more temporal positions and different inter prediction directions to perform the reordering and the selection. Moreover, NA-MVP candidate type is further extended with more spatially non-adjacent positions. The target reference picture of the TMVP candidate can be selected from any one of reference picture in the list according to scaling factor. The selected reference picture is the one whose scaling factor is the closest to 1.

During the development of the motion refinement technique, the following problems and areas for improvements are recognized.

First, the TM cost is calculated based as the sample difference between current template and reference template. The difference of the initial MV and the refined MV is not considered. The initial MV in merge mode is inherited from the spatial or temporal neighboring blocks which has high correlation with the current block. Although the abundant refinement on the initial MV may be good for the template, it is not good for the current block itself. Therefore, the MV difference between the initial MV and refined MV should be taken into consideration during the refinement.

Figure 22:
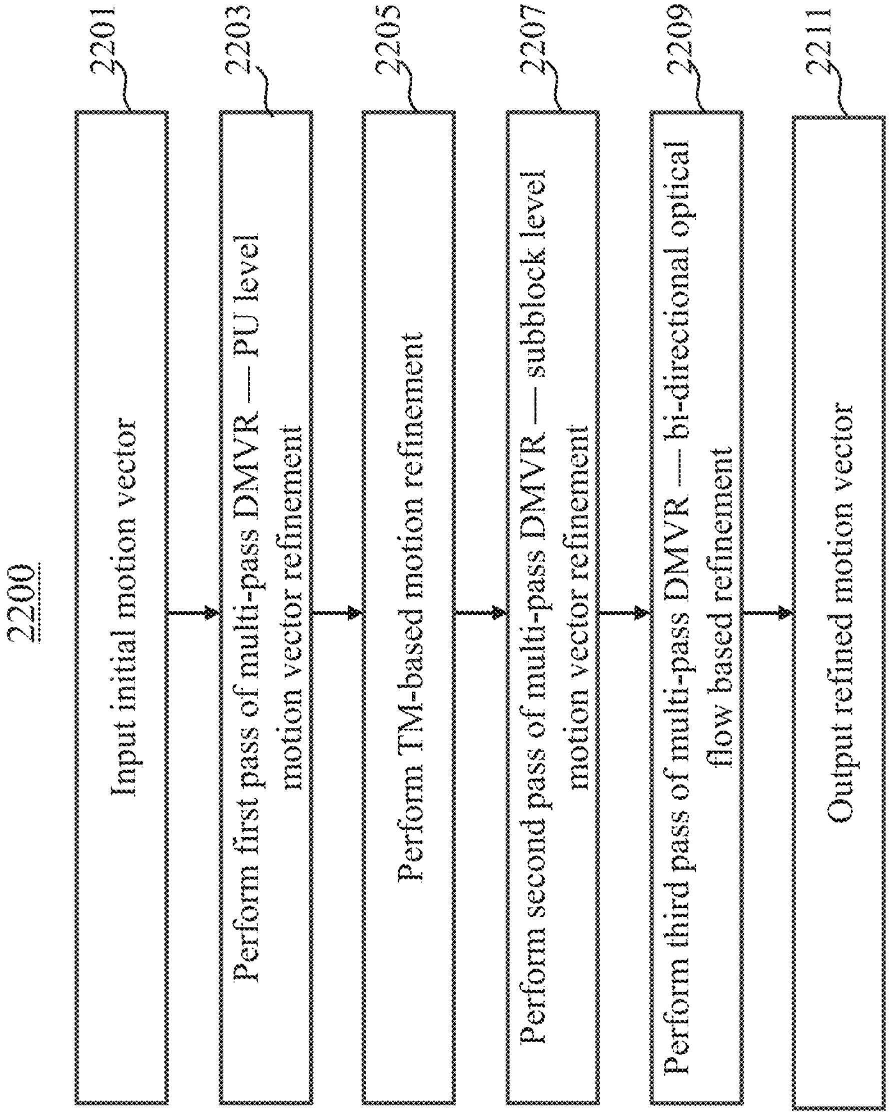
FIG. 22 is a flowchart of a process of template-based reordering and template-based motion refinement, according to some embodiments of the present disclosure.

Second, the order of performing the TM and multi-pass DMVR may affect the quality of the resulting refined MV. FIG. 22 is a flowchart of a process 2200 of template-based reordering and template-based motion refinement. As shown in FIG. 22, the process 2200 begins with an initial motion vector input in step 2201. In step 2203, a first pass of multi-pass decoder-side motion vector refinement (DMVR) is performed, which involves prediction unit (PU) level motion vector refinement. The process 2200 then moves to step 2205, where template matching-based (TM-based) motion refinement is applied. Then, in step 2207, a second pass of multi-pass DMVR is performed, which focuses on subblock level motion vector refinement. In step 2209, a third pass of multi-pass DMVR is performed, utilizing bi-directional optical flow based refinement. The process 2200 concludes with outputting the refined motion vector in step 2211. However, in the above process, as bilateral search scheme is used in DMVR, the MV refinement is usually less than that in TM process. So, performing multi-pass DMVR after TM process as a finer tuning could produce a better refined MV.

Third, for bi-prediction, the TM cost of bi-prediction CostBi is compared with the TM cost of uni prediction of list 0 or list 1 (denoted as cost0_uni and cost1_uni). If cost_bi is much larger than uni-prediction cost, the bi-prediction is converted to uni-prediction. However, choosing TM cost of uni-prediction of list 0 or list 1 for comparison is dependent on which one is refined in the last step, which can not guarantee that the one selected one for comparison is a smaller one between cost0_uni and cost1_uni.

Fourth, in ARMC-TM reordering process, a candidate is considered as redundant if the cost difference between a candidate and its predecessor is inferior to a lambda value. And the candidate is reordered to make the difference between two consecutive candidate cost is larger than a lambda value, which is to guarantee the diversity of the candidates. However, in the current design, the diversity-based reordering is performed differently for the TM based merge list and regular merge list, which creates inconsistency.

Fifth, the affine merge mode is used to capture the object with more complex motion than translation and TM is a tool to further improve the motion accuracy which is inherited from the previously coded blocks without MV offset signaling. In the current design, TM is only applied in regular merge mode, but not applied in affine merge mode. However, the affine motion inherited from the previously coded blocks may not perfectly match with the current block. So, template matching based refinement is helpful.

The present disclosure provides solutions to one or more of the above-described problems.

In some embodiments, the TM cost is extended by taking MV offset into consideration to give a penalty of a search position far away from the initial position. The MV offset here refers to the difference between the refined MV and the initial MV. Thus, a large MV refinement itself gives a big cost, which prevents the refined MV goes too far away from the initial MV which is derived from the neighboring blocks.

Assuming MV0=($mv0_x$, $mv0_y$) denotes the initial MV before TM refinement and the MV=($mv_x$, $mv_y$) denotes the MV of each search point. Then the MV cost, denoted as cost (MV) can be derived as:

$$\text{cost}(MV) = (|mv0_x = -mv_x| + |mv0_y - mv_y|) \tag{22}$$

and TM cost, which is denoted as cost (TM), can be a weighted sum of MV cost and sample cost:

$$\text{cost}(TM) = \text{cost}(\text{sample}) + w \times \text{Cost}(MV). \tag{23}$$

The sample cost is derived according to the sample difference between the template of the current block and the template of the reference cost. It can be SAD or SATD of the two templates.

Figure 23A:
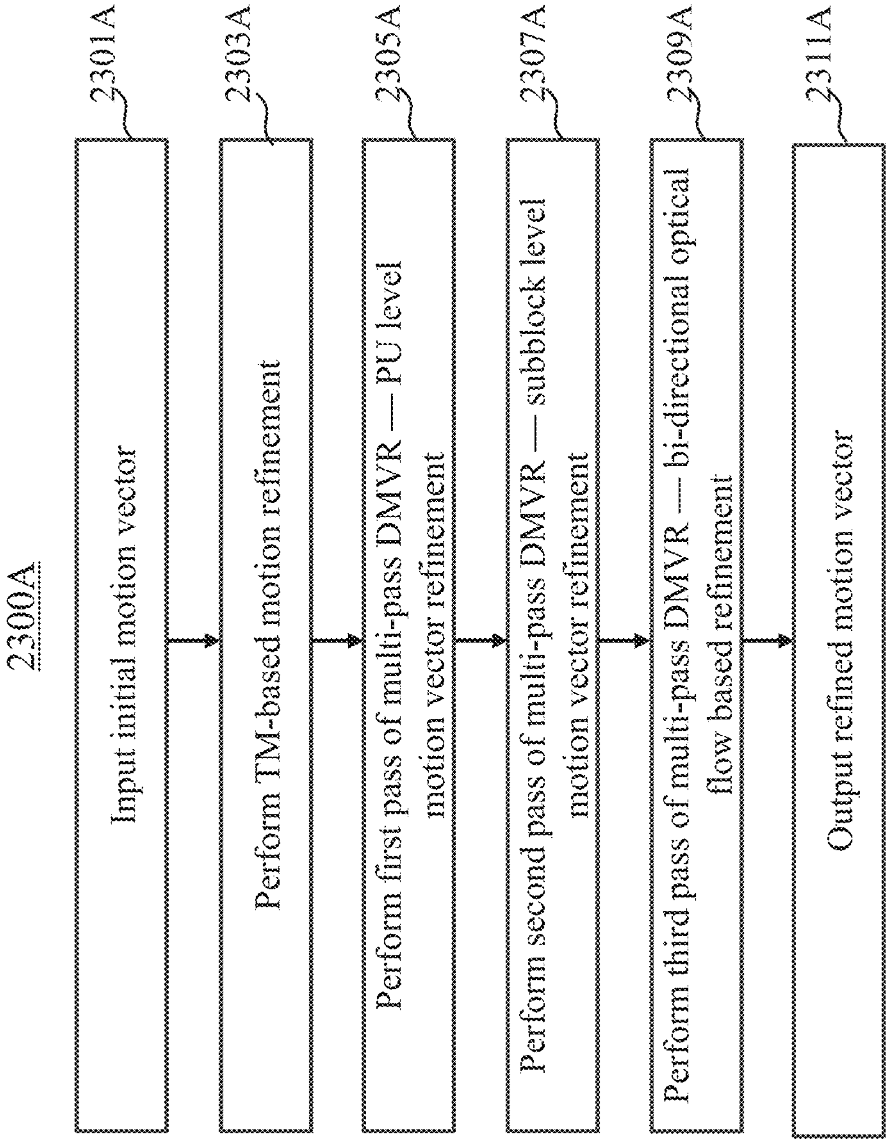
FIG. 23A is a flowchart of a process of template-based reordering and template-based motion refinement, according to some embodiments of the present disclosure.

The template matching based refinement and bilateral matching based refinement can be both applied on a coding block. In some embodiments, when TM and multi-pass DMVR are both applied on a coding block, the TM is performed first as MV offsets derived by TM is usually larger than that derived by DMVR. Conducting TM before DMVR could make it easy to reach an optimal MV value. So, for each merge candidate, the TM refinement is performed based on the initial MV and a TM refined MV is output. Then based on TM refined MV, if the coding block satisfy the DMVR condition, the DMVR is performed based in the TM refined MV and a DMVR refined MV is output and used as the final MV for motion compensation. The process is shown as process 2300A in FIG. 23A. Process 2300A can be performed by an encoder (e.g., by process 200A of FIG. 2A or 200B of FIG. 2B), by a decoder (e.g., by process 300A of FIG. 3A or 300B of FIG. 3B), or by one or more software or hardware components of an apparatus (e.g., apparatus 400 of FIG. 4). For example, one or more processors (e.g., processor 402 of FIG. 4) can perform process 2300A. In some embodiments, process 2300A can be implemented by a computer program product, embodied in a computer-readable medium, including computer-executable instructions, such as program code, executed by computers (e.g., apparatus 400 of FIG. 4). Referring to FIG. 23A, process 2300A begins with step 2301A, where an initial motion vector is input. The process then moves to step 2303A, which performs TM based motion refinement on the initial motion vector. Following this, step 2305A executes the first pass of multi-pass DMVR at the PU level. The process 2300A then proceeds to step 2307A, where the second pass of multi-pass DMVR is performed, focusing on subblock level motion vector refinement. After the subblock level refinement, step 2309A carries out the third pass of multi-pass DMVR, which involves bi-directional optical flow based refinement. Finally, the method 2300A concludes with step 2311A, where the refined motion vector is output.

Figure 23B:
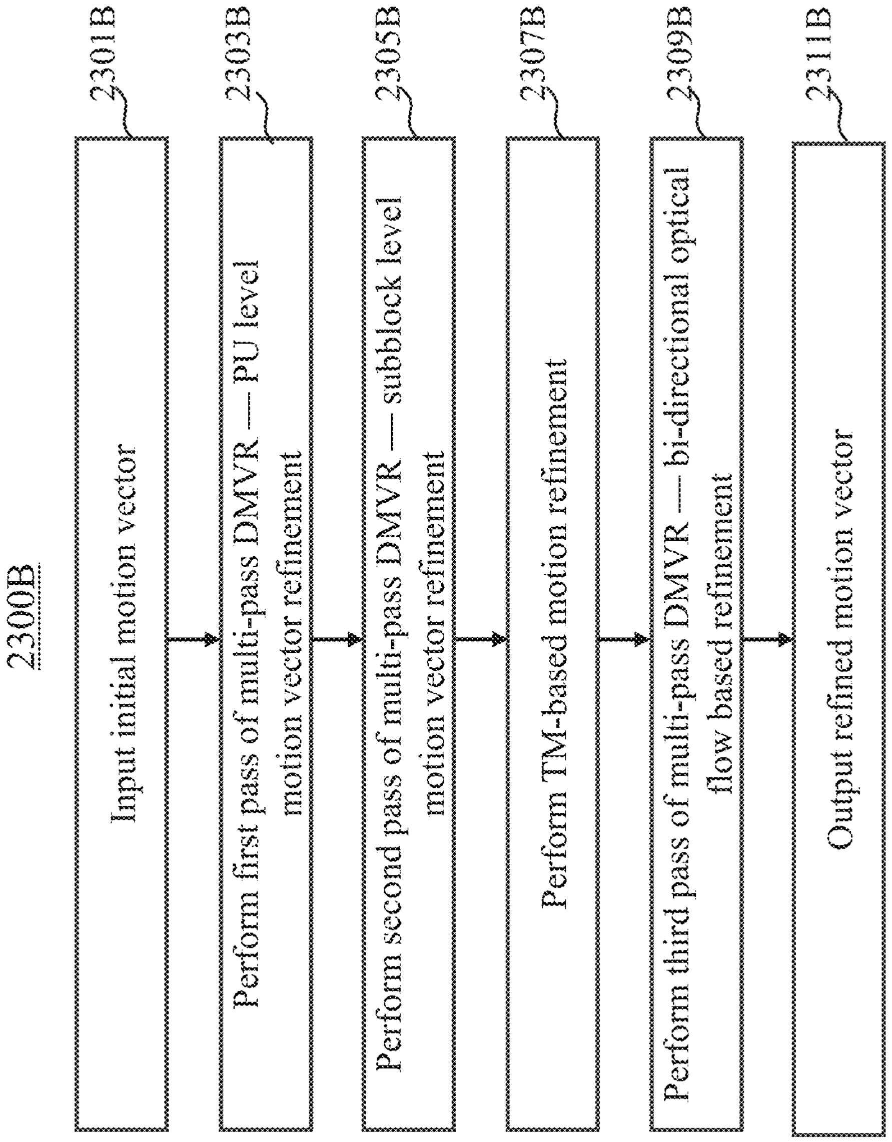
FIG. 23B is a flowchart of another process of template-based reordering and template-based motion refinement, according to some embodiments of the present disclosure.

As TM refinement will check uni-prediction TM cost and bi-prediction TM cost, it will also convert a bi-prediction block into uni-prediction. And DMVR can only be applied on bi-prediction block. So, performing TM before DMVR will make some coding blocks loss the chance being refined by DMVR if these coding blocks are converted into uni-prediction. Thus, in some other embodiments, the TM is performed after DMVR or after the second pass of multi-pass DMVR. The process is shown as process 2300B in FIG. 23B. Process 2300B can be performed by an encoder (e.g., by process 200A of FIG. 2A or 200B of FIG. 2B), by a decoder (e.g., by process 300A of FIG. 3A or 300B of FIG. 3B), or by one or more software or hardware components of an apparatus (e.g., apparatus 400 of FIG. 4). For example, one or more processors (e.g., processor 402 of FIG. 4) can perform process 2300A. In some embodiments, process 2300A can be implemented by a computer program product, embodied in a computer-readable medium, including computer-executable instructions, such as program code, executed by computers (e.g., apparatus 400 of FIG. 4). Referring to FIG. 23B, process 2300B begins with step 2301B, where an initial motion vector is input. The process then moves to step 2303B, which performs the first pass of multi-pass DMVR at the PU level for motion vector refinement. Following this, step 2305B executes the second pass of multi-pass DMVR, focusing on subblock level motion vector refinement. The process then proceeds to step 2307B, where TM-based motion refinement is performed. After the TM-based refinement, step 2309B carries out the third pass of multi-pass DMVR, which involves bi-directional optical flow based refinement. Finally, process 2300B concludes with step 2311B, where the refined motion vector is output.

When TM is applied on a bi-prediction coding block, each of the two MVs will be refined separately as uni-prediction. The two MVs refined as uni-prediction are denoted as MV0_uni and MV1_uni, the corresponding TM cost are denoted as cost0_uni and cost1_uni. After refinement of each MV, the two MVs are further refined jointly as bi-prediction. To reduce the complexity of joint refinement of two MVs, the refinement is implemented with an iteration process. That is, fixing one MV and refining another MV and then fixing the refined MV and refining the fixed MV. The refinement process can be the process 1000 shown in FIG. 10. During the refinement, the two templates of the two reference blocks, one from reference picture list 0 and the other from reference picture 1, are combined to get template of the predicted block and the TM cost of the bi-prediction, denoted as cost_bi, is calculated based on the difference between the template of the current block and the template of the predicted block. Finally, the TM cost of bi-prediction will be compared with TM cost of uni-prediction, cost0_uni or cost1_uni. If uni-prediction has a less TM cost, the current coding block is converted to a uni-prediction block. In the current design, if MV of list 0 is refined at last, cost_bi is compared with cost1_uni and if MV of list 1 is refined at last, cost_bi is compared with cost0_uni.

In some embodiments, it is proposed to compare TM cost of bi-prediction with the smaller one of TM costs of uni-prediction, which is not related with which MV being refined at last. The process can be described in pseudo code as follows.

```
if(costO__uni < cost1__uni)
{
   cost__uni = cost0__uni
   MV__uni=MV0__uni
}
else
{
   cost__uni=cost1__uni
   MV__uni=MV1__uni
}
if(cost__bi > K × cost__uni)
```

-continued

```
{
   set the current coding block as uni-prediction
   set the motion vector of the coding block as MV__uni
}
where K is a factor larger than 1.
```

The merge candidates are adaptively reordered with template matching (TM). For regular merge candidate, the diversity of the candidates is considered in the reordering. A candidate is considered as redundant if the cost difference between a candidate and its predecessor is inferior to a lambda value. A redundant candidate is moved at a further position in the list. This further position is the first position where the candidate is diverse enough compared to its predecessor. So, the cost difference between two consecutive candidates are compared with the lambda value and the candidate is moved to a further position in the list if the difference of the candidate cost and its predecessor is less than the lambda value. However, for TM merge candidate, the smaller one between the cost of the first candidate cost and cost difference of two consecutive candidates are compared with the lambda value. Even if the cost difference of any consecutive candidates is larger than the lambda value, the first candidate will be moved to a further position if the cost of the first candidate itself is less than the lambda.

In some embodiments, in order to make consistency design between regular merge candidate reordering and TM candidate reordering, the first candidate cost is not considered in the TM candidate reordering. That is, the diversity based reordering method is the same for regular merge candidate and TM merge candidate. Only the cost difference of two consecutive candidates are compared with the lambda value and if the cost difference is less than the lambda value, the later one of the two consecutive candidate is move to a further position that has a cost sufficiently different from its new predecessor.

In some embodiments, the diversity-based reordering is not applied for TM merge candidates. After constructing the TM merge candidates list, the candidates are reordered based on the template cost, and then each candidate is refined by template matching based refinement. There is no diversity-based reordering conducted.

In some embodiments, the diversity-based reordering is not applied for TM merge candidates. After constructing the TM merge candidates list, the candidates are reordered based on the template cost, and then each candidate is refined by template matching based refinement. There is no diversity-based reordering conducted.

In some embodiments, the template matching based refinement is applied to affine merge mode to improve the accuracy of the affine motion which is inherited from the previously coded blocks.

To apply the template matching based refinement, the TM affine merge list is derived first. In one example, the TM affine merge list is the same as the regular affine merge list. That is, the same candidates are used for regular affine merge mode and TM affine merge mode. For regular affine merge mode, one of the candidates is selected and indicated in the bitstream. The motion of the selected candidate is used for motion compensation. For TM affine merge mode, the motion of the candidates are refined by TM and the refined motion of the selected candidate is used for motion compensation.

As TM merge mode, the motion will be refined by TM. So, in another example, a different affine merge candidate list is constructed by considering TM influence. In the TM merge candidate list, the similarity of the candidates is checked. If a candidate to be inserted into the list is similar to the existing candidates in the list, the candidate will not be inserted as the similar candidate may produce the same motion after TM refinement. To check the similarity of the two affine merge candidates, the difference of CPMVs of the affine candidates are calculated and compared with the threshold. Suppose a first affine merge candidate has three CPMVs as CPMV0=(mv0_x, mv0_y), CPMV1=(mv1_x, mv1_y), CPMV2=(mv2_x, mv2_y), and a second merge candidate has three CPMVs as CPMV0'=(mv0_x', mv0_y'), CPMV1'=(mv1_x', mv1_y'), CPMV2'=(mv2_x', mv2_y'). The first affine candidate and the second affine candidate is similar with each other if $$\begin{cases} |mv0\_x - mv0\_x'| < TH0\_x \\ |mv0\_y - mv0\_y'| < TH0\_y \\ |mv1\_x - mv1\_x'| < TH1\_x \\ |mv1\_y - mv1\_y'| < TH1\_y \\ |mv2\_x - mv2\_x'| < TH2\_x \\ |mv2\_y - mv2\_y'| < TH2\_y \end{cases} \tag{24}$$

where TH0_x, TH0_y, TH1_x, TH1_y, TH2_x, TH2_y are thresholds which may be dependent on the coding block size. All the types of affine candidate, including inherited candidate from adjacent neighbors and non-adjacent neighbors, constructed candidates from adjacent neighbors, the first type of constructed candidates from non-adjacent neighbors, the second type of constructed candidates from non-adjacent neighbors, regression-based candidates, pairwise affine candidate.

Figure 24:
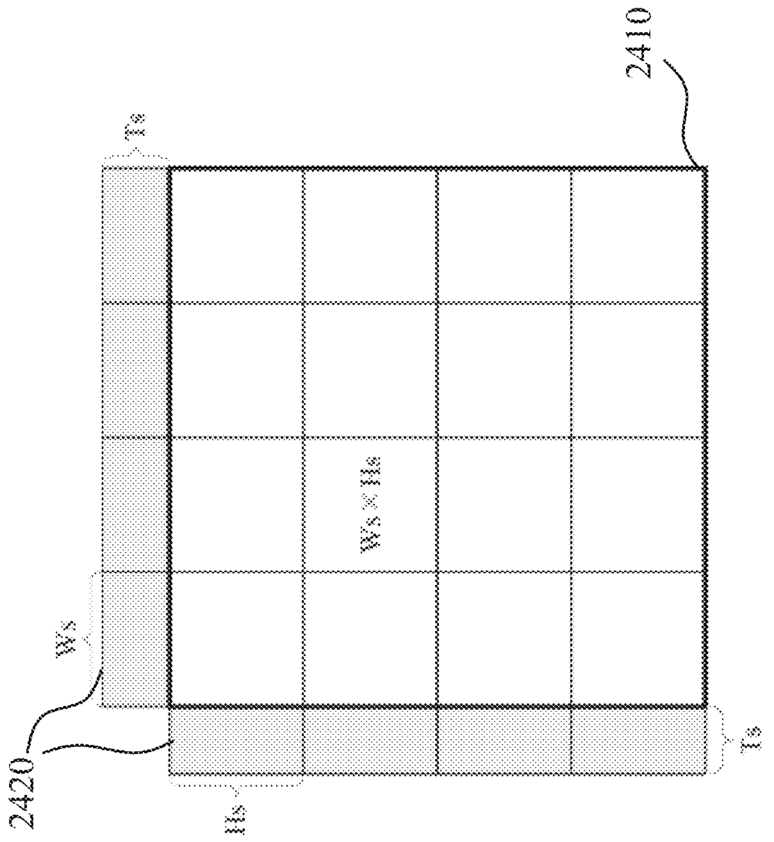
FIG. 24 illustrates a above template and a left template for affine motion compensation, according to some embodiments of the present disclosure.

As affine motion compensation is performed in subblock level, a template of an affine merge candidate can also comprise multiple sub-templates. FIG. 24 illustrates a template structure for affine motion compensation. As shown in FIG. 24, if the template size used in TM is equal to Ts and the affine merge candidates with subblock size equal to Ws×Hs, the above template comprises multiple sub-templates each with the size of Ws×Ts, and the left template comprises multiple sub-templates each with the size of Ts×Hs. In FIG. 24, the white region 2410 is a current affine motion coded coding block comprising 16 subblocks and the grey filled area 2420 is a template comprising 4 above sub-template with size of Ws×Ts and 4 left sub-template with size of Ts×Hs. Ts is the size of the template. For example, it can be 1, 2, 3, or 4.

Figure 25:
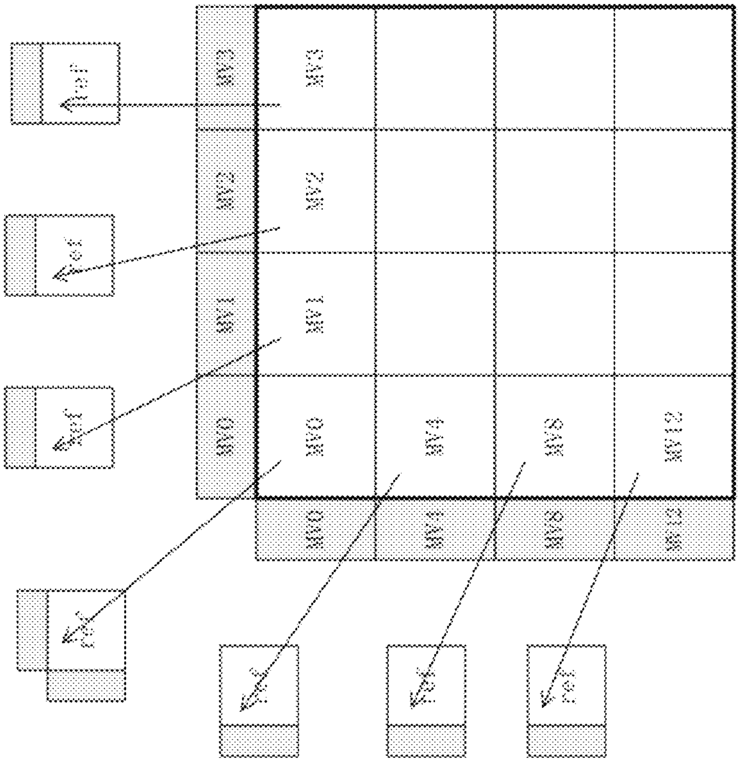
FIG. 25 illustrates MVs of sub-templates of an affine motion codec block, according to some embodiments of the present disclosure.
Figure 26:
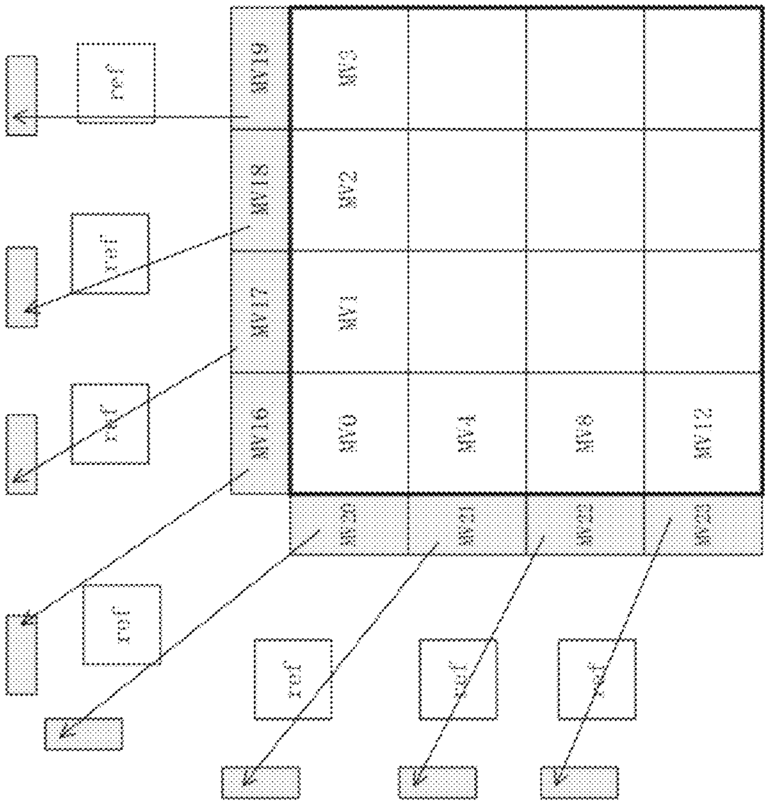
FIG. 26 illustrates MVs of sub-templates of an affine motion codec block, according to some embodiments of the present disclosure.

To get the template of the reference block, the MV of each subblock template can be derived. In one example, the MV of each sub-template is borrowed from the boundary subblock. That is, the MV of a sub-template is the same as the MV of the adjacent subblock within the current coding block. This example is illustrated in FIG. 25, in which the white subblocks are the subblocks of the current coding block and the grey filled subblocks are the sub-templates. The MV values (i.e., MV0, MV1, MV2, MV3, MV4, MV8 and MV12) of the boundary subblocks are the same as the MV values of the sub-templates. Thus, the sub-templates of reference block are adjacent to the reference subblocks which are marked as "ref". In another example, the MV of sub-template is derived according to the affine model based on the coordinate of each sub-template. Thus, each sub-template has its own MV, which may be different from that of boundary subblock. This example is illustrated in FIG. 26, in which the boundary subblocks have MV values marked as MV0, MV1, MV2, MV3, MV4, MV8 and MV12, and the sub-templates have MV values marked as MV16 to MV23. As the sub-template MVs may be different from the boundary subblock MVs, the sub-templates of the reference block may be separated from the corresponding reference subblocks "ref".

For an affine model, motion vector at sample location (x, y) can be formulated as $$\begin{cases} mv_x = ax + by + mv_{0x} \\ mv_y = cx + dy + mv_{0y} \end{cases} \tag{25}$$

wherein ($mv_x$, $mv_y$) is the derived motion vector at sample location (x, y), ($mv_{0x}$, $mv_{0y}$) is called based MV in the model which is the motion vector at sample location (0, 0), and a, b, c, d are the parameters of the affine model which can be derived based on the motion vectors at other two sample locations in the plane. Generally, base MV in the model can be the motion vector at any sample location, not necessarily at location (0, 0). If motion vector at sample location (w, h) is chosen as the base MV (denoted as ($mv_{wx}$, $mv_{hy}$), then motion vector at sample location (x, y) can be formulated as $$\begin{cases} mv_x = a(x-w) + b(y-h) + mv_{wx} \\ mv_y = c(x-w) + d(y-h) + mv_{hy} \end{cases} \tag{26}$$

For 4-parameters affine model, b is equal to −c and d is equal to a. Thus, 4-parameter affine model can be formulated as $$\begin{cases} mv_x = a(x-w) - c(y-h) + mv_{wx} \\ mv_y = c(x-w) + a(y-h) + mv_{hy} \end{cases} \tag{27}$$

Theoretically, all the parameters of affine model, including a, b, c, d and $mv_{wx}$, $mv_{wy}$ can be refined in DMVR. However, to restrict the complexity, in some embodiments of this disclosure, it is proposed to fix the affine parameter a, b, c and d, and only refine base MV ($mv_{wx}$, $mv_{hy}$). That is, the template only has translation motion in the searching process. In each search position, all the sub-templates have the same MV offset compared with the initial MV. Thus, the three CPMVs and the subblock MVs also have a same MV offset after refinement. If CPMV0, CPMV1 and CPMV2 are the three initial CPMVs and sbMV is a subblock MV before refinement, then after refinement, the refined CPMVs, denoted as CPMV0', CPMV1' and CPMV2' and the refined subblock MV sbMV' obey the following equations.

$$CPMV' = CPMV0 + \text{MV\_offset} \tag{28}$$

$$CPMV1' = CPMV1 + \text{MV\_offset} \tag{29}$$

$$CPMV2' = CPMV2 + \text{MV\_offset} \tag{30}$$

$$sbMV' = sbMV' + \text{MV\_offset} \tag{31}$$

where MV_offset is the MV refinement in the TM refinement process (i.e., a MV offset producing the best TM cost).

Figure 27B:
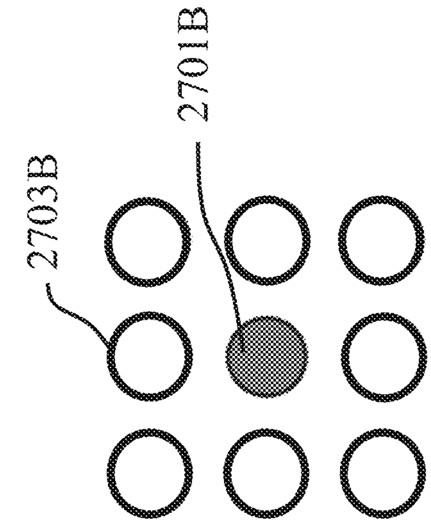
FIG. 27B illustrates a half-pixel TM search process, according to some embodiments of the present disclosure.
Figure 27A:
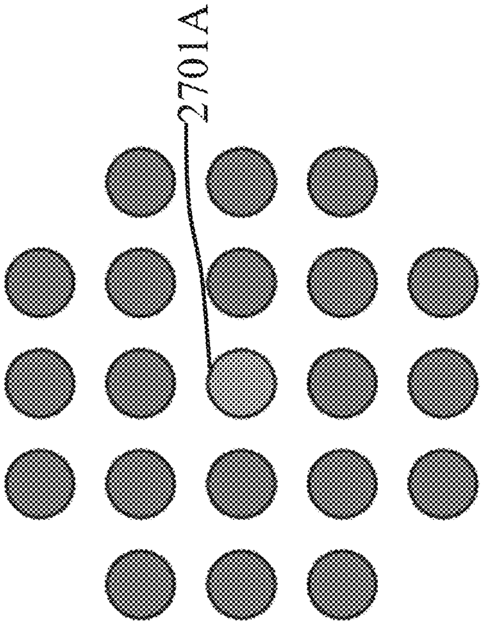
FIG. 27A illustrates an integer template matching (TM) search process, according to some embodiments of the present disclosure.

All the search patterns, including cross search, 8-position diamond search, 16-position diamond search pattern can be used. For example, to reduce the search complexity, FIG. 27A shows an exemplary search pattern used in an integer TM search process. In FIG. 27A, the circle 2701A is the initial position and the 20 positions (shown as dark circles) around the initial position 2701A are searched. The position with the minimum TM cost is obtained as the best position in the integer search and it is set as the initial position in the following fractional search process. FIG. 27B shows an exemplary search pattern used in the fractional search process. This fractional search pattern can be used to reduce the search complexity. As shown in FIG. 27B, the circle 2701B is the best integer position obtained in the integer search process and the 8 half-pixel positions 2703B (white filled circles) around the best integer position 2701B are searched in the fractional search process. The fractional search position with the minimum TM cost is obtained as the best position in the fractional search and output as the optimal position and the corresponding MV is referred to as the refined MV.

The affine TM refinement can also be applied together with affine DMVR on an affine coded block. In that case, TM refinement process can be before DMVR, or can be after base MV refinement of affine DMVR but before affine model parameter refinement of affine DMVR, or after affine DMVR.

Figure 28:
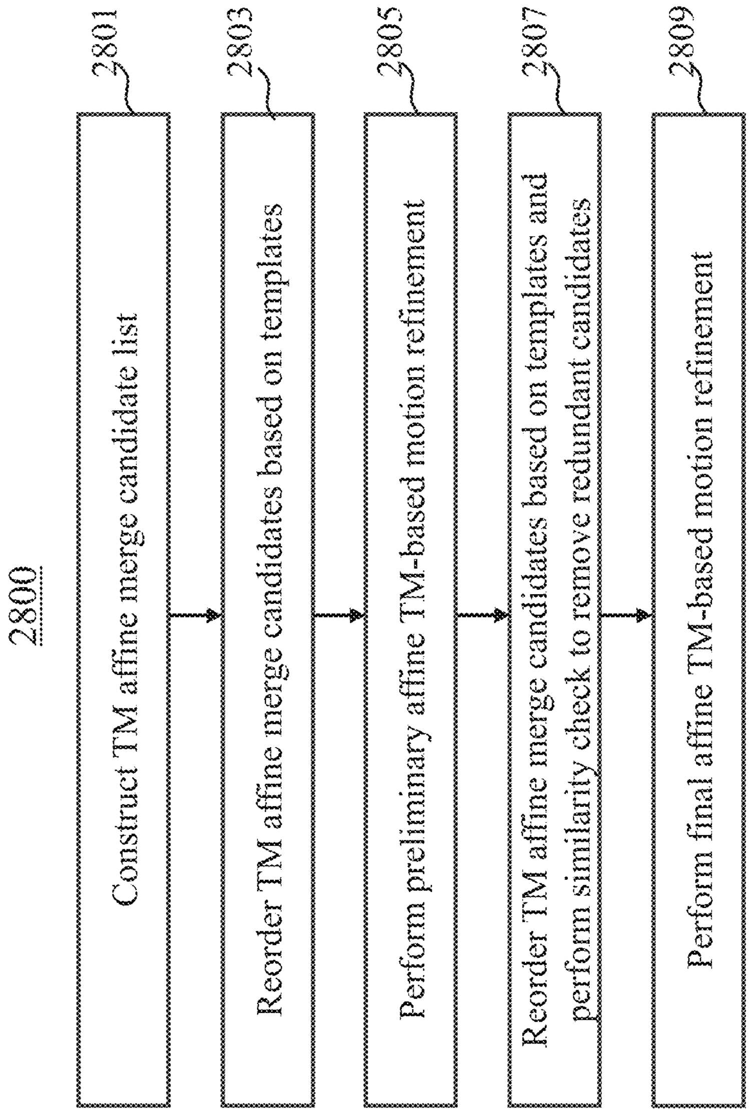
FIG. 28 is a flowchart of a process of an affine merge mode, according to some embodiments of the present disclosure.

Template-based reordering of merge candidate can also be performed to TM merge candidate. For example, after TM affine merge candidate list construction, the candidates are reordered based on the template. And then the TM refinement is applied on the candidates in the lists, and after TM refinement, another template-based reordering and candidate similarity check can be performed to remove the redundant candidate. A second TM refinement can be applied after then. FIG. 28 provides a processing order example for affine merge mode. FIG. 28 is a flowchart of a process 2800 of applying template-based reordering to TM merge candidate, according to some embodiments of the present disclosure. Process 2800 can be performed by an encoder (e.g., by process 200A of FIG. 2A or 200B of FIG. 2B), by a decoder (e.g., by process 300A of FIG. 3A or 300B of FIG. 3B), or by one or more software or hardware components of an apparatus (e.g., apparatus 400 of FIG. 4). For example, one or more processors (e.g., processor 402 of FIG. 4) can perform process 2800. In some embodiments, process 2800 can be implemented by a computer program product, embodied in a computer-readable medium, including computer-executable instructions, such as program code, executed by computers (e.g., apparatus 400 of FIG. 4). As shown in FIG. 28, the process 2800 begins with step 2801, where a TM affine merge candidate list is constructed. Following this, in step 2803, the TM affine merge candidates are reordered based on a template. The process then moves to step 2805, where a preliminary affine TM-based refinement is performed. After the preliminary refinement, step 2807 involves reordering the TM affine merge candidates based on the template and performing a similarity check to remove redundant candidates. Finally, in step 2809, a final affine TM-based motion refinement is carried out. The process 2800 can be used for refining and optimizing affine merge candidates using template matching techniques. This can improve the quality of the merge candidates through reordering, refinement, and redundancy removal.

In some embodiments, to further improve the affine model accuracy, the non-translation parameters are also refined in TM refinement. one way to refine the non-translation parameters is to add offsets to the initial parameters to get refined parameters, and then derive CPMVs, subblock MVs or sub-template MVs from the refined non-translation parameters. The template matching cost is obtained by calculating the difference of the template of the current block and the template of the reference block which are fetched according to sub-template MVs.

In some embodiments, affine non-translation parameter search is performed. For affine model $$\begin{cases} mv_x = a(x-w) + b(y-h) + mv_{wx} \\ mv_y = c(x-w) + d(y-h) + mv_{hy} \end{cases} \quad (32)$$

the non-translation parameter a, b, c and d are searched in the parameter space. For a search position with parameter values equal to a', b', c' and d', it can be represented as:

$$\begin{cases} a' = a + \text{offset\_a} \\ b' = b + \text{offset\_b} \\ c' = c + \text{offset\_c} \\ d' = c + \text{offset\_d} \end{cases} \quad (33)$$

where offset_a, offset_b, offset_c and offset_d are the parameter offsets searched in the TM refinement process. After getting values of a', b', c', d', the subblock MVs and sub-template MVs can be derived according to the affine model with a', b', c', d'. And the TM cost can be calculated as the difference between the template of reference block and the template of the current block. By comparing the TM costs corresponding to different values of offset_a, offset_b, offset_c and offset_d, the best non-translation parameter a', b', c', d' can be obtained as the refined non-translation parameters and the corresponding CPMVs can be calculated as the refined CPMVs.

To reduce the search complexity, the 2-parameter search can be applied. That is, offset_b is constrained to be equal to −offset_c and offset_d is constrained to be equal to offset_a. So, the encoder and the decoder only need to search for offset_a and offset_b, and derive offset_b and offset_d according to offset_a and offset_b. It is called 2 parameter refinement in this disclosure.

Figure 6:
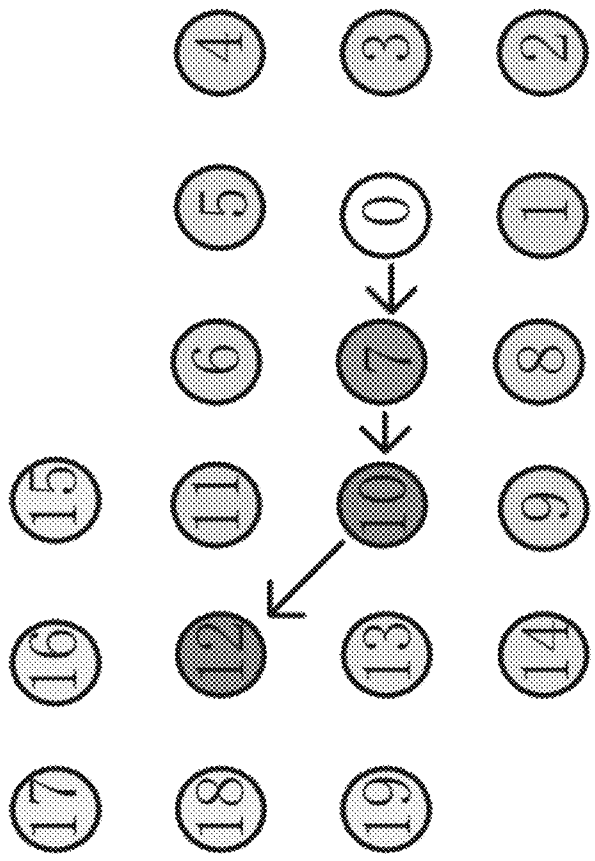
FIG. 6 illustrates an exemplary 3×3 square search pattern, according to some embodiments of the present disclosure.

The MV search method can be applied in parameter search. For example, for 2 parameter refinement, as shown in FIG. 6, the 3×3 square search scheme or 3×3 cross search scheme may be applied to get the best parameter offset. For 4 parameter refinement, the search is conducted in 4-dimension space. The 3×3×3×3 square search or 3×3×3×3 cross search scheme may be applied to get the best parameter offset. For 3×3×3×3 square search scheme, for each central position, there are 80 neighboring positions to be searched and for 3×3×3×3 cross search, for each central position, there are 8 neighboring positions to be searched, which is much less than 3×3×3×3 square search. Suppose the parameter offset of the current central position is (offset_a, offset_b, offset_c, offset_d), the eight neighboring positions to be searched in 3×3×3×3 cross search scheme is (offset_a+step_a, offset_b, offset_c, offset_d), (offset_a-step_a, offset_b, offset_c, offset_d), (offset_a, offset_b+step_b, offset_c, offset_d), (offset_a, offset_b, −step_b offset_c, offset_d), (offset_a, offset_b, offset_c+step_c, offset_d), (offset_a, offset_b, offset_c-step_c, offset_d), (offset_a, offset_b, offset_c, offset_d+step_d), (offset_a, offset_b, offset_c, offset_d-step_d), where step_a, step_b, step_c and step_d are search step for parameter a, b, c, and d, respectively. After getting the best parameter offset, error surface based offsets estimation could also be applied to further refine the parameter with higher precision. The search step could be step as a fixed value. For example, as the MV precision is 1/16 in ECM and the basic subblock for affine motion compensation is 4×4, the search step can be 1/64 such that the MV difference of two adjacent subblocks is 1/64× 4=1/16, which is the minimum difference for a MV. The search step could be larger than 1/64. A larger search step reduces the search round to save the search time but loss the refinement precision. In another example, the search step is dependent on the CU size. Assume the width of CU is w and the height of CU is h, the search step for a and c is denoted as step_ac and the search step for d and b is denoted as step_db. The search step may satisfy the following condition:

$$\begin{cases} w \times \text{step\_ac} = T1 \\ h \times \text{step\_bd} = T2 \end{cases} \tag{34}$$

wherein T1 and T2 are two thresholds, which can be 1/16, 1/8, 1/4 or other values. This threshold defines the MV difference for the sample in the current coding that is farthest away from the sample with the base MV can be generated during each step of search. It is noted that, in this example, different parameters have different search steps.

For the cost of each search point, the difference of the parameter offsets could also be considered. That is, the cost could be a weighted sum of the SAD or SATD between the template of the reference block and the template of the current block as TMCost=w*ParameterOffsetCost+sadCost, wherein w is a weight, sadCost is the SAD/SATD or mean removed SAD/SATD cost of the templates and ParameterOffsetCost is a cost dependent on the parameter offset of the refined parameters. When w is equal to 0, only sadCost is considered.

Figure 29A:
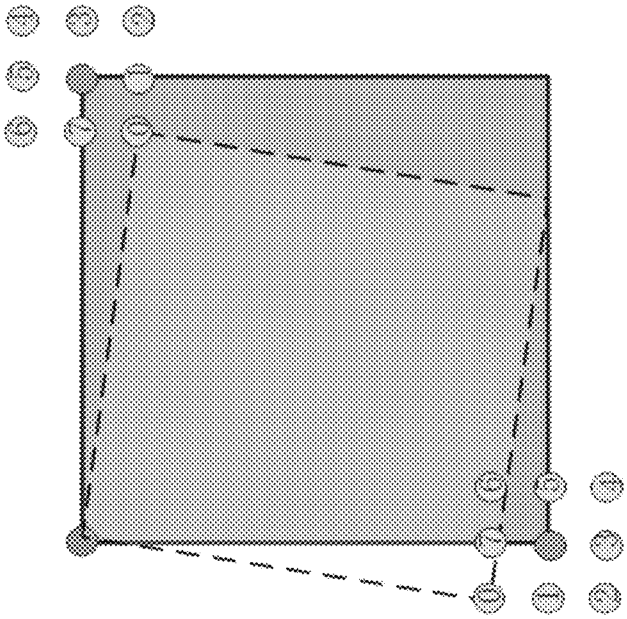
FIG. 29A illustrates refining affine parameters by fixing a top-left control point motion vector (CPMV) as a base MV, according to some embodiments of the present disclosure.
Figure 29B:
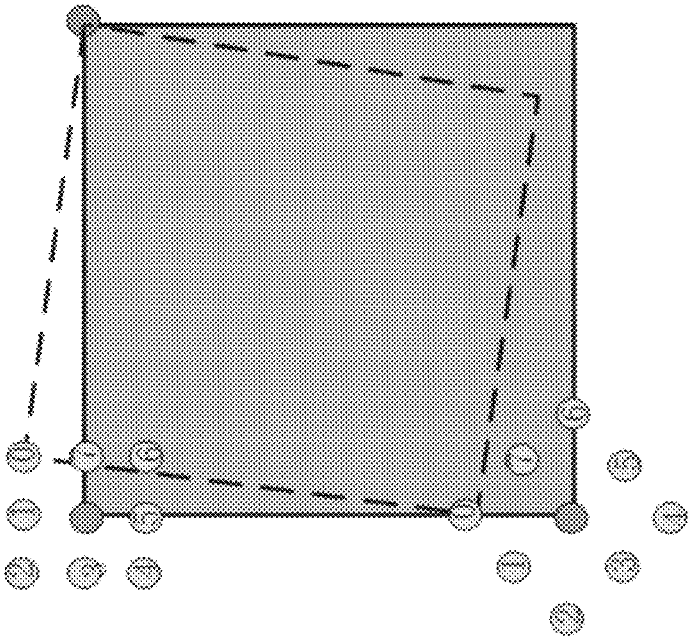
FIG. 29B illustrates refining affine parameters by fixing a top-right CPMV as a base MV, according to some embodiments of the present disclosure.
Figure 29C:
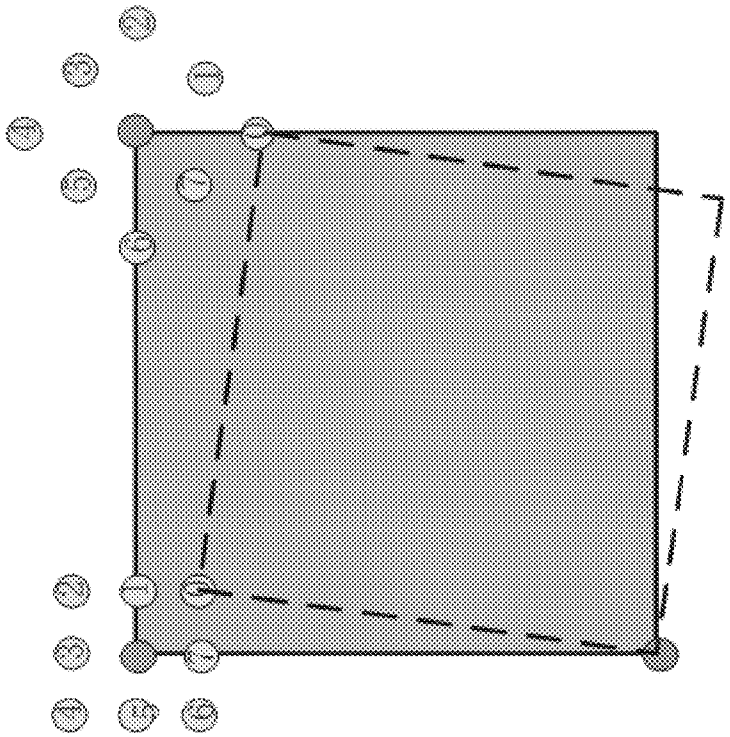
FIG. 29C illustrates refining affine parameters by fixing a bottom-left CPMV as a base MV, according to some embodiments of the present disclosure.

When search for the affine parameters, the base MV can be fixed. Theoretically, MV at any point in the plane can be fixed as base MV. In some embodiments, the CPMV is fixed as base MV. For example, as shown in FIG. 29A, the top-left CPMV is fixed, and the affine parameters are refined. With the change of the parameters, the coding block rotates and zoom in/out, so the top-right CPMV and the right-bottom CPMV are also changed. And then the subblock MV is derived with the refined parameters and the new CPMV, and the motion compensation is performed. FIG. 29B and FIG. 29C provide the examples of fixing top-right and bottom-left CPMV as base MV, respectively, and refining 4 affine parameters. Similar to FIG. 29A FIG. 29B and FIG. 29C perform refinement of affine parameters based on the base MV—with the change of the parameters, the coding block rotates and zoom in/out, so the non-fixed CPMVs are changed. In some embodiments, different CPMVs are fixed as the base MV in turn. That is, the search process is divided into several steps. In the first step, as shown in FIG. 29A, the top-left CPMV is fixed as the base MV and the parameters are searched. With the best parameters obtained, the top-right CPMV can be calculated. Then in the second step, as shown in FIG. 29B, the refined top-right CPMV is fixed and the parameters are refined again. With the best parameters obtained in the second step, the left-bottom CPMV can be calculated. And then in the third step, as shown in FIG. 29C, the refined left-bottom CPMV is fixed and the parameters are refined again. The steps can be repeated several times. That is, the third step can be followed by the first step with new top-left CPMV fixed as base MV. And the process can continue until some conditions are satisfied. For example, the conditions could be but not limited to: 1) a pre-set iteration number; 2) the SAD or SATD between reference template and the current template less than a threshold; 3) the current fixed CPMV is the same as or similar to that in last iteration; and/or 4) the offset of the parameters in this round of search is less than a threshold.

As described above, the affine parameter refinement process is similar with the base MV refinement process. The search process is conducted one round by one round. For each round, if the template matching cost of the central position is less than all the neighboring position, the current central position is found as the best position and the search process terminates; otherwise, the neighboring position with the least template matching cost is set as a new center position and the search goes to the next round. To control the search complexity, a maximum number of search round is set at both encoder and decoder side. Thus, the search process terminates either the central position is with the least cost or the search round number achieves the pre-set maximum number. A larger maximum search round number can give more coding performance gain but takes longer encoding and decoding time. Accordingly, to make a good tradeoff between complexity and performance, the maximum search round may be dependent on fixed base MV, QP, temporal layer, CU size, etc. For example, referring to the search processes shown in FIGS. 29A to 29C, in the first step, the top-left CPMV is fixed as the base MV, the maximum search round number is set to a large value as it is the first time parameters are refined the larger search round can exploit coding performance. Then in the second step, the top-right CPMV is fixed as base MV, the maximum search round number is set to a small value as the parameters are already refined in the first step and a small search round number can save coding time. Then in the third step, the bottom-left CPMV is fixed as base MV, the maximum search round number is set to a smaller value to further save coding time. Thus, in the disclosed embodiments, the maximum search round number is set to a larger value in the beginning and changed to a smaller value in the later steps.

In some embodiments, the maximum search round number of the later steps is dependent on the actual search round number of previous steps. For example, in the first step when the top-left CPMV is set as base MV, the maximum search round number is set to N. However, during the first step search, the search process terminates in the k-th (k<N) search round as the central position has the minimum template matching cost. Then in the second step, the maximum search round number is set to k/2 (or other values dependent on k and less than P). If in the first step search round, the search process achieves the maximum search round number, then in the second step, the maximum search round number is set to P, which is a value less than N. The similar method can be applied in the third step. If the actual search round number of the second step achieves the maximum number, the maximum search round number of the third step is set to is L where L is less than P; if the actual search round number is t that doesn't achieve the maximum number, the maximum search round number of the third step is set to t/2. Thus, the maximum search round number is adaptively determined by the previous search process.

In some embodiments, to reduce the complexity, the search neighboring positions of a search round is reduced adaptively according to the previous search round. For example, in the 3×3×3×3 cross search scheme, there are eight neighboring positions to be searched in each search round. Suppose the current center is (a, b, c, d) and the eight neighboring positions to be checked are pa0=(a+s, b, c, d), pa1=(a-s, b, c, d), pb0=(a, b+s, c, d), pb1=(a, b−s, c, d), pc0=(a, b, c+s, d), pc1=(a, b, c−s, d), pd0=(a, b, c, d+s) and pd1=(a, b, c, d−s), respectively. The template matching cost of eight neighboring positions are denoted as cost_pa0, cost_pa1, cost_pb0, cost_pb1, cost_pc0, cost_pc1, cost_pd0, and cost_pd1. Compare cost_pa0 and cost_pa1, if cost_pa0 is less than cost_pa1, then only positive offset is considered for parameter a in the next round, if cost_pa0 is greater than cost_pa1, then only minus offset is considered for parameter a in the next round. Compare cost_pb0 and cost_pb1, if cost_pb0 is less than cost_pb1, then only positive offset is considered for parameter b in the next round, if cost_pb0 is greater than cost_pb1, then only minus offset is considered for parameter b in the next round. Compare cost_pc0 and cost_pc1, if cost_pc0 is less than cost_pc1, then only positive offset is considered for parameter c in the next round, if cost_pc0 is greater than cost_pc1, then only minus offset is considered for parameter c in the next round. Compare cost_pd0 and cost_pd1, if cost_pd0 is less than cost_pd1, then only positive offset is considered for parameter d in the next round, if cost_pd0 is greater than cost_pd1, then only minus offset is considered for parameter d in the next round. Suppose for the current search round, cost_pa0 is less than cost_pa1, cost_pb0 is greater than cost_pb1, cost_pc0 is less than cost_pc1 and cost_pd0 is greater than cost_pd1, then in the next round the four neighboring positions to be checked are (a'+s, b', c', d'), (a', b'−s, c', d'), (a', b', c'+s, d') and (a', b', c', d'−s) where (a', b', c', d') is the center position of the next round search.

In some embodiments, the minimum template matching cost of the current search round is compared with that of last search round. If the minimum cost reduction is a small amount, the search process terminates. For example, if the cost of last search round is A, which means the cost of the current search center is A, the minimum cost of the neighboring positions is B at position posb, where B<A. According to search rule, the search goes to the next round with search center posb. However, in some embodiments, if A−B<K or B>A×f, the search process terminates and the posb is selected as the best position is this search step. K and f are pre-set thresholds. For example, f is a factor less than 1, like 0.95, 0.9 or 0.8.

Quantization Parameter (QP) controls the quantization in video coding. With a higher QP, a bigger quantization step is used, and thus more distortion is introduced. So, for higher QP, more search rounds are needed in the refinement and it increases more encoding time. To reduce the total coding time, in some embodiments, it is proposed to have a smaller maximum search round number in higher QP than in lower QP. Other methods for reducing complexity may also be used in high QP. for example, reducing the neighboring positions to be searched, adaptively reducing the search round or early terminating the search process dependent on the previous search process may be used. Thus, in the disclosed embodiments, different search strategies may be adopted in different QPs. In some embodiments, as a high QP introduces more distortion which requires more refinement, a smaller maximum search round number is set for low QP and a greater maximum search round number is set for high QP to keep the coding efficiency and reduce the complexity at the same time. Other methods for reducing complexity may also be used in low QP, as low QP case may not need to much refinement.

The search rounds may also be dependent on the sequence resolution. For example, for video sequences with large resolution, the maximum search round number or the neighboring positions to be searched in each round is set to a big value and for the video sequences with small resolution, the maximum search round number or the neighboring positions to be searched in each round is set to a small value.

Inter-coded frame, like B frame and P frame, has one or more reference frames. The time distance between the current frame and reference frame impacts the accuracy of the inter prediction. The time distance between two frames in video coding is usually represented by picture order count (POC) distance. Usually, with a longer POC distance, the inter prediction accuracy is lower and the motion information accuracy is also lower, and thus it needs more refinement. Thus, in the disclosed embodiments, the search process depends on the POC distance between the current frame and the reference frame. For hierarchical B frame, the frame with a higher temporal layer has short POC distance to the reference frame and the frame with a lower temporal layer has longer POC distance to the reference frame. So, the search process can also depend on the temporal layer of the current frame. For example, disable the affine parameter refinement for the high temporal layer as high temporal layer has short POC distance to the reference frame and may not need refinement. In another example, set a small search round or reduce neighboring search positions for high temporal layer frame. Also, other methods to reduce the complexity of parameter refinement could be used for the high temporal layer frame. So, in the disclosed embodiments, the parameter refinement process depends on the temporal or the POC distance between the current frame and the reference frame.

In some embodiments, affine model search can be used. In the above embodiments, the affine parameters are directly refined. However, the affine motion includes translation, rotation and zooming. The translation is represented by the base MV, and rotation and zooming are represented by the affine parameters. So, in some embodiments, the motion of rotation and zoom is refined. That is, based on the original affine model, an additional rotation and scaling is added. If the original affine model is described as following equation.

$$\begin{cases} mv_x = ax + by + mv_{0x} \\ mv_y = cx + dy + mv_{0y} \end{cases} \tag{35}$$

wherein $(mv_x, mv_y)$ is the derived motion vector at sample location (x, y). Then a rotation with angle t and scaling with factor k is applied as the following equation $$\begin{vmatrix} mv_x \\ mv_y \end{vmatrix} = k \begin{vmatrix} \cos t & -\sin t \\ \sin t & \cos t \end{vmatrix} \begin{vmatrix} ax + by + mv_{0x} \\ cx + dy + mv_{0y} \end{vmatrix} \tag{36}$$

t and k are two parameters to be searched during the DMVR process. The current search methods can be applied to get the best value of t and k. Then the subblock MV is derived with equation (35) and subblock level motion compensation is performed to get the predictor of the current affine-coded block.

All the existing early termination method in the MV refinement method can also be applied in the parameter refinement process. For example, during the refinement process, if the SAD/SATD between two predictors are less than a threshold, the search process is terminated.

In some embodiments, CPMV search can be performed. The TM search is not conducted directly on non-translation parameters, but on CPMVs. As the non-translation parameters are refined, so each CPMVs may have a different offset in the refinement that is different from base MV refinement in which all the CPMVs have the same offset in the refinement. If CPMV0, CPMV1 and CPMV2 are the three initial CPMVs, the refined CPMVs are denoted as CPMV0', CPMV1' and CPMV2'. The refined CPMVs are represented as:

$$CPMV' = CPMV0 + \text{MV\_offset0}$$
$$CPMV1' = CPMV1 + \text{MV\_offset1}$$
$$CPMV2' = CPMV2 + \text{MV\_offset2} \tag{37}$$

where MV_offset0, MV_offset1 and MV_offset2 are the three MV offsets searched in the TM refinement process for three CPMVs. For each search position, the sub-template MVs are derived according to the CPMVs corresponding to the search position, and the TM cost is calculated accordingly. The CPMVs producing the minimum TM cost is treated as the refined CPMVs output by the TM refinement process.

All the search methods and the complexity reduction methods used in non-translation parameter search can be used in the CPMV search.

In some embodiments, optical based search can be used. To reduce the search complexity, optical flow-based search scheme is used in some embodiments. In this scheme, the next search position is calculated from the optical flow equation.

For an affine model $$\begin{cases} mv_x = ax + by + mv_{0x} \\ mv_y = cx + dy + mv_{0y} \end{cases} \tag{38}$$

construct the coefficient matrix as $$A = \begin{bmatrix} G_{x0} & x_0G_{x0} & G_{y0} & x_0G_{y0} & y_0G_{x0} & y_0G_{y0} \\ G_{x1} & x_1G_{x1} & G_{y1} & x_1G_{y1} & y_1G_{x1} & y_1G_{y1} \\ G_{x2} & x_2G_{x2} & G_{y2} & x_2G_{y2} & y_2G_{x2} & y_2G_{y2} \\ G_{x3} & x_3G_{x3} & G_{y3} & x_3G_{y3} & y_3G_{x3} & y_3G_{y3} \\ \dots & \dots & \dots & \dots & \dots & \dots \\ G_{xn} & x_nG_{xn} & G_{yn} & x_nG_{yn} & y_nG_{xn} & y_nG_{yn} \end{bmatrix} \tag{39}$$

where $G_{xi}$ and $G_{yi}$ is the horizontal and vertical gradient of the i-th sample in the template of the predicted block for a search position, $(x_i, y_i)$ is the coordinate of the i-th sample in the template of the predicted block for the search position. Then the equation is constructed as $$AX = R \tag{40}$$

where X is the vector of the affine model parameters and R is the residual vector of template samples. Thus, the values of X and R can be the following:

$$X = \begin{bmatrix} mv_{0x} \\ a \\ mv_{0y} \\ c \\ b \\ d \end{bmatrix} \text{ and } R = \begin{bmatrix} R_0 \\ R_1 \\ R_2 \\ R_3 \\ \dots \\ R_n \end{bmatrix} \tag{41}$$

where $R_i$ is the difference of i-th sample in the template of the reference block and i-th sample in the template of the current block.

By solving the equation AX=R, the resulting solution X can be used as the affine parameter for the next search position.

For each search position, the equation (40) is solved to obtain the next position until it reaches a maximum number, or the next search position has already been searched before.

In some embodiments, template matching for bi-predicted affine block can be performed. Similar to non-affine coded block, for bi-prediction affine merge candidate, the refinement of the list 0 motion and list 1 motion can be performed iteratively.

First, the initial subblock MVs of two reference picture lists are derived based on the initial CPMVs, and then the list 0 template (which is the template of the reference block in the reference picture of list 0) and the list 1 template (which is the template of the reference block in the reference picture of list 1) are obtained from reference pictures by interpolation. Then the TMcost0 (which is the SAD or SATD between list 0 template and the current block template) and the TMcost1 (which is the SAD or SATD between list 1 template and the current block template) are calculated. If the TMcost0 is less than TMcost1, reference list 0 MV are fixed and list 1 motion is refined in the first step. If the TMcost0 is larger than TMcost1, reference list 1 motion is fixed and list 0 motion is refined in the first step.

In the template matching refinement for each list, the base MV refinement and the affine model (non-translation parameter) refinement can be applied. To refine list 0 motion, the base MV offset MV_offset searched and parameter offset $\text{offset}_a$, offset_b, offset_c, offset_d searched in the refinement process are for list 0. To refine list 1 motion, the base MV offset MV_offset searched and parameter offset $\text{offset}_a$, offset_b, offset_c, offset_d searched in the refinement process are for list 1.

After list i motion is refined, the list 1−i motion can be further refined. The same base MV refinement and affine model (non-translation parameters) refinement can be applied to list i−1 motion.

After list 1−i motion is refined, the list i motion can be further refined. The iteration can be performed to further refine the affine motion for two reference lists.

After the iterative bi-prediction affine motion refinement, the bi-prediction cost can also be compared with uni-prediction cost to determine whether convert the bi-predicted affine block into uni-predicted affine block.

In some embodiments, certain methods can be used to reduce the complexity of the affine non-translation parameter search. For example, the complexity reducing methods that can be applied in affine model search or CPMV search can also be used in the bi-predicted affine block template matching to reduce the complexity. In some embodiments, whether the template matching is performed on bi-predicted affine block is dependent on Quantization Parameter (QP). And if the template matching is performed on bi-predicted affine block, the iterative number is dependent on QP. Since QP controls the quantization in video coding and higher QP may introduce more coding errors, more refinement is needed in high QP case. Thus, to reduce the complexity and maintain the coding efficiency, the template matching is disabled for bi-predicted affine block in low QP case, and the iterative number is smaller in lower QP case and greater in higher QP case.

In some embodiments, whether the template matching is performed on bi-predicted affine block is dependent on the video sequence resolution. For example, for video sequences with high resolution, the template matching is disabled or the iterative number is set to a smaller value for longer sequences, and the template matching is enabled or the iterative number is set to a greater value for shorter sequences. Alternatively, for video sequences with low resolution, the template matching is disabled, or the iterative number is set to smaller value; and for high resolution, the template matching is enabled or the iterative umber is set to a greater value.

In some embodiments, whether the template matching is performed on bi-predicted affine block is dependent on the picture order count distance, and/or the temporal layer. For inter-coded frame, e.g., B frame and P frame, there is one or more reference frames. The time distance between the current frame and reference frame impacts the accuracy of the inter prediction. The time distance between two frames in video coding is usually represented by picture order count (POC) distance. Usually, with a longer POC distance, the inter prediction accuracy is lower and the motion information accuracy is also lower, and thus more refinement is needed. Thus, template-matching based refinement can be enabled in large POC distance case and disabled in short POC distance case. That is, if the POC distance between the current frame and the reference frame is larger than a threshold, the template-matching based refinement is used; and if the POC distance between the current frame and the reference frame is smaller than the threshold, the template-matching based refinement is disabled. As another example, the iterative number is larger in longer POC distance case and smaller in shorter POC distance case. That is, if the POC distance between the current frame and the reference frame is longer, the iterative number of bi-predicted affine block refinement is greater; and if the POC distance between the current frame the reference frame is shorter, the iterative number of bi-predicted affine block is smaller. For hierarchical B frame, a frame with a higher temporal layer has a shorter POC distance to the reference frame, and a frame with a lower temporal layer has a longer POC distance to the reference frame. Thus, whether to enable or disable template-matching based refinement on bi-predicted affine block may depend on the temporal layer of the current frame. For example, template-matching on bi-predicted affine block can be disabled for a high temporal layer, because the higher temporal layer has a shorter POC distance to the reference frame and may not need refinement; while template-matching on bi-predicted affine block can be enabled for a lower temporal layer, because the lower temporal layer has a longer POC distance to the reference frame and needs refinement. As another example, the iterative number of template-matching based refinement for bi-predicted affine block can be set to a smaller value for a higher temporal layer, and set to a greater value for a lower temporal layer. Consistent with the disclosed embodiments, other methods to reduce the complexity can be used for the higher temporal layer frame, and are not limited by the present disclosure.

In some embodiments, base MV refinement and affine model (non-translation parameter) refinement can be combined.

The base MV refinement and affine model (i.e., affine non-translation parameter) refinement can be applied to an affine coded block at the same time.

Figure 30A:
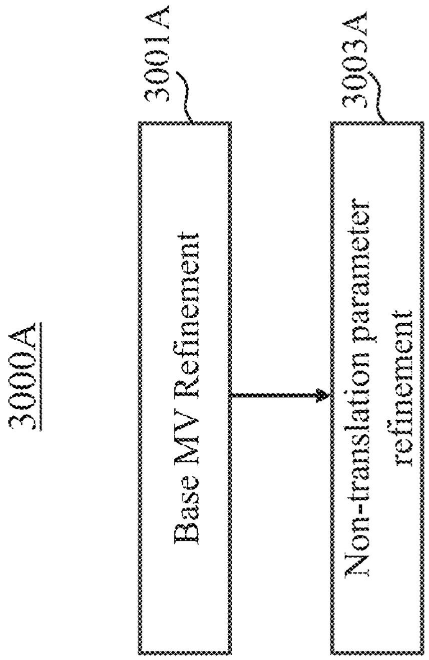
FIG. 30A is a flowchart illustrating a process of performing base MV refinement and non-translation parameter refinement sequentially, according to some embodiments of the present disclosure.
Figure 30B:
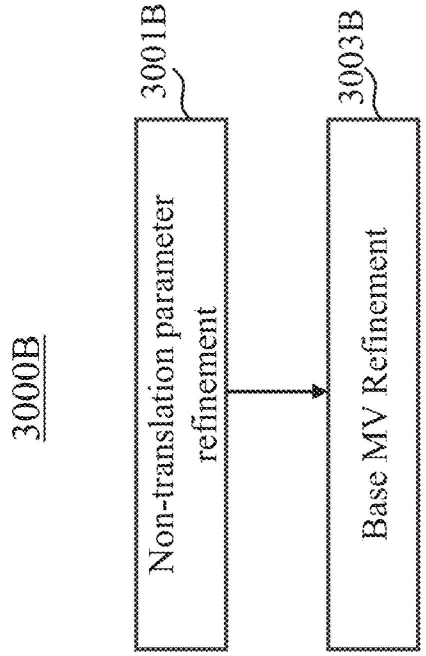
FIG. 30B is a flowchart illustrating a process of performing non-translation parameter refinement and base MV refinement sequentially, according to some embodiments of the present disclosure.

In some embodiments, the base MV refinement and affine non-translation parameter refinement are performed sequentially as in FIGS. 30A and 30B. For example, FIG. 30A shows a process 3000A in which the base MV refinement is performed first (step 3001A in FIG. 30A). After the refinement, in step 3003A, the refined base MV is fixed and then the affine non-translation parameter refinement is performed. As another example, FIG. 30B shows a process 3000B in which the non-translation parameter refinement is performed first (step 3001B in FIG. 30A). After the refinement, in step 3003B, the refined parameters are fixed and then the base MV of the affine model is refined. Processes 3000A and 3000B can be performed by an encoder (e.g., by process 200A of FIG. 2A or 200B of FIG. 2B), by a decoder (e.g., by process 300A of FIG. 3A or 300B of FIG. 3B), or by one or more software or hardware components of an apparatus (e.g., apparatus 400 of FIG. 4). For example, one or more processors (e.g., processor 402 of FIG. 4) can perform processes 3000A and 3000B. In some embodiments, processes 3000A and 3000B can be implemented by a computer program product, embodied in a computer-readable medium, including computer-executable instructions, such as program code, executed by computers (e.g., apparatus 400 of FIG. 4).

Figure 31:
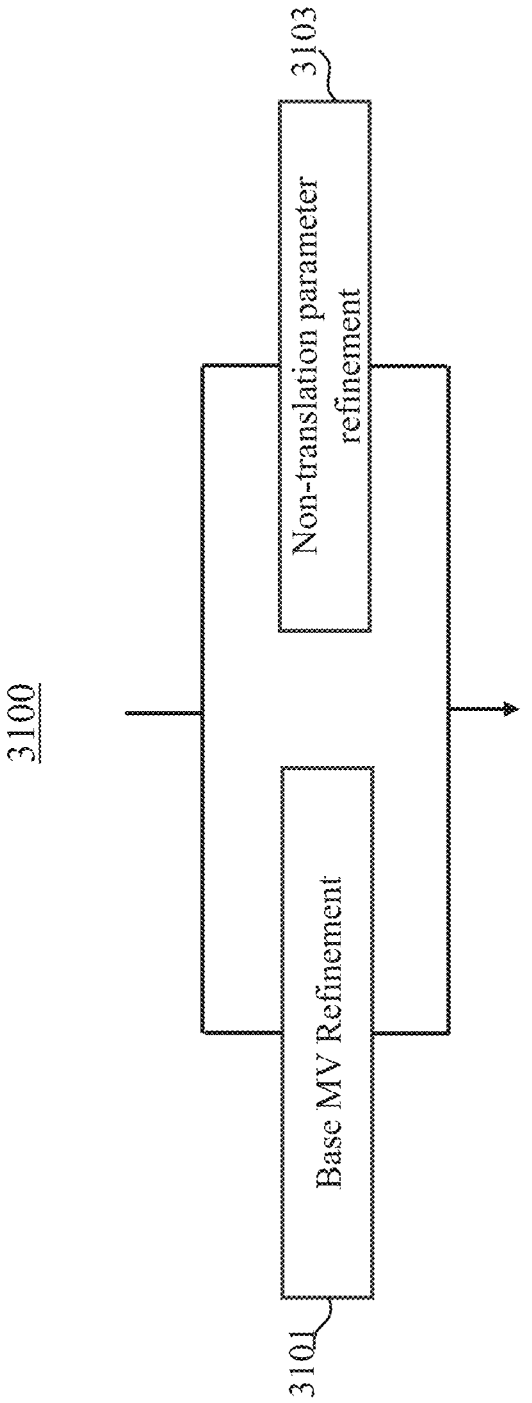
FIG. 31 is a flowchart illustrating a process of performing base MV refinement and non-translation parameter refinement parallelly, according to some embodiments of the present disclosure.

In some embodiments, the base MV refinement and the affine non-translation parameter refinement are performed parallelly. For example, FIG. 31 shows a process 3100 in which the base MV refinement (step 3101) and non-translation parameter refinement (step 3103) are performed in parallel. Specifically, in step 3101, the base MV refinement is performed based on the initial affine motion to get refined base MV and the corresponding TM cost is costBaseMV. And in step 3103, the non-translation parameter refinement is performed based on the initial affine motion to get refined parameters and the corresponding TM cost is costParameter. If costBaseMV is less than or equal to costParameter, the result of the base MV refinement is used as the final motion for motion compensation. That is, the base MV of the affine model for the current block is refined and the parameters of the affine model for the current block are not refined. If costParameter is less than costBaseMV, the result of the non-translation parameter refinement is used as the final motion for motion compensation, That is, the base MV of the affine model for the current block is not refined but the non-translation parameters of the affine model for the current block is refined.

Figure 32:
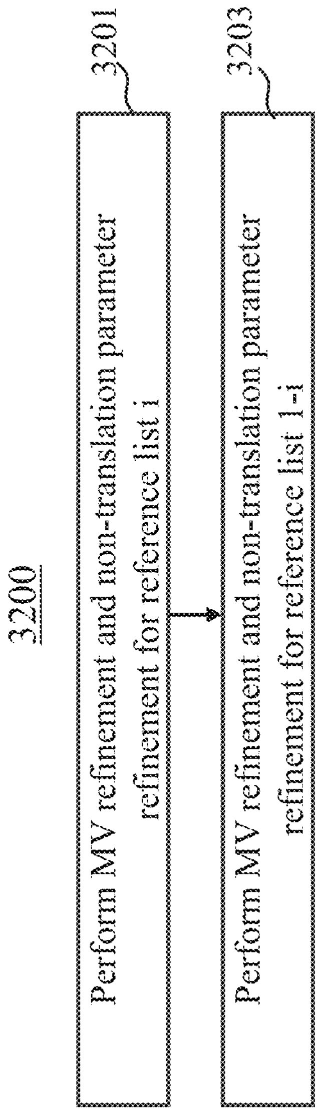
FIG. 32 is a flowchart illustrating a refinement order of applying affine TM on a bi-prediction block, according to some embodiments of the present disclosure.
Figure 33:
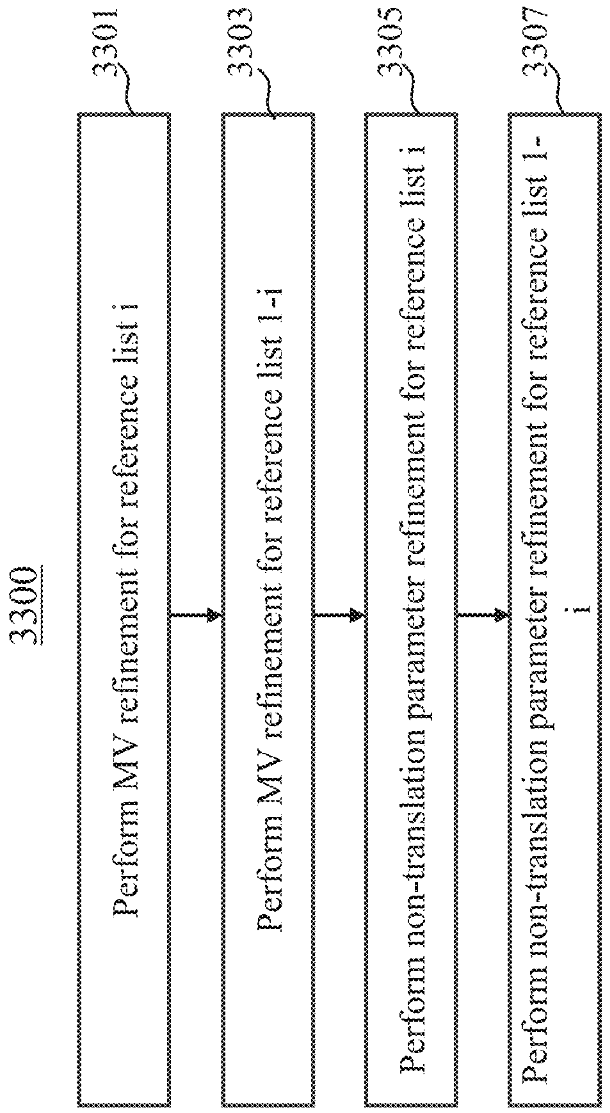
FIG. 33 is a flowchart illustrating another refinement order of applying affine TM on a bi-prediction block, according to some embodiments of the present disclosure.

When affine TM is applied on the bi-prediction block, the iterative refinement can be combined with the base MV refinement and non-translation parameter refinement. For example, FIG. 32 shows a refinement order of applying affine TM on a bi-prediction block. In step 3201, when list i motion is being refined, the base MV and non-translation parameter of affine model for list i are refined. After that, in step 3203, when list 1−i motion is being refined, the base MV and non-translation parameter of affine model for list i are refined. As another example, FIG. 33 shows another refinement order of applying affine TM on a bi-prediction block. In FIG. 33, base MV and non-translation parameter refinement are performed in two stages with different iterative processes. That is, the base MV is refined first in an iterative process: refining base MV of list i (step 3301) and then refining base MV list 1−i (step 3303). After that, non-translation parameters are refined in another iterative process: refining non-translation parameter of list i (step 3305) and then refining non-translation parameters of list 1−i (step 3307).

To reduce the complexity, in some embodiments, non-translation parameter refinement is not applied on bi-prediction block. That is, for uni-prediction affine block, both base MV refinement and non-translation parameter refinement are applied and for bi-prediction affine block, only base MV refinement is applied. In some other embodiments, non-translation parameter refinement is not applied on uni-prediction block. That is, for bi-prediction affine block, both base MV refinement and non-translation parameter refinement are applied and for uni-prediction affine block, only base MV refinement is applied. So, whether to apply affine TM is dependent on the prediction direction.

In some other embodiments, the TM cost obtained in the TM process is used to determine the skip or continue the following TM process. For example, in the case of base MV refinement and non-translation parameter refinement are performed sequentially, denote the TM cost of the initial motion as cost0 and TM cost after base MV refinement as cost1, if cost1<cost0 or cost1<k×cost0 where k is a factor less than 1, the non-translation parameter refinement is performed, otherwise the non-translation parameter refinement is skipped. The condition cost1<cost0 or cost1<k× cost0 means the base MV refinement does improve the affine motion for the current block, so TM maybe suitable for the current block and the non-translation is worth being performed. In another example, in the case of base MV refinement and non-translation parameter refinement are performed sequentially, denote the TM cost of the initial motion as cost0 and TM cost after base MV refinement as cost1, if cost1<h×cost0 where h is a factor less than 1, the non-translation parameter refinement is skipped, otherwise the non-translation parameter refinement is performed. The condition cost1<h×cost0 means the base MV refinement already improve the affine model significantly and thus the non-translation parameter refinement may not be needed.

After the base MV refinement and non-translation parameter refinement, the TM cost is denoted as costA and costA can be compared with the TM cost of initial motion cost0. And only if costA<h×cost0 where h is a factor less than 1, the refined affine motion is used for the motion compensation, otherwise the initial motion is used for the motion compensation.

In some embodiments, high-level control flag(s) can be used for template-based refinement. For example, to control the template-matching based refinement, a control flag can be signaled in a sequence parameter set (SPS). The value of the flag can be set by the encoder and signaled to the decoder, to indicate whether TM based refinement is enabled or disabled. When the flag is equal to 1, the TM is enabled for the sequence; and when the flag is equal to 0, the TM is disabled for the sequence. The encoder has the flexibility to set the value of the flag. For example, to use the method to reduce the complexity, the encoder may set the value to 0 in low QP case and set the flag to 1 in high QP case. Consistent with the disclosed embodiments, the encoder may set the flag in other ways, and the present disclosure does not limit the specific ways of setting the flag values.

In some embodiments, there can be multiple control flags in SPS to control template-matching based refinement. For example, a first SPS flag can be used to control template-matching based refinement for conventional inter-prediction block, a second SPS flag can be used to control template-matching based refinement for affine parameter of a affine coded block, a third SPS flag can be used to control template-matching based refinement for bi-predicted affine block, and/or a fourth SPS flag can be used to control template-matching based refinement for subblock temporal motion prediction (SBTMVP) block.

In some embodiments, to have a finer control granularity, another control flag can be signaled in the picture parameter set (PPS) to control template-matching based refinement in picture level. Thus, different frames within one sequence may have different choices. TM can be enabled on some frames and disabled on the other frames. Similar with the control flag(s) in SPS, multiple PPS control flags can be used for TM based refinement. For example, a first PPS flag can be used to control template-matching based refinement for conventional inter-prediction block, a second PPS flag can be used to control template-matching based refinement for affine parameter of a affine coded block, a third PPS flag can be used to control template-matching based refinement for bi-predicted affine block, and/or a fourth PPS flag can be used to control template-matching based refinement for subblock temporal motion prediction (SBTMVP) block.

The embodiments described in the present disclosure can be freely combined.

It is contemplated that the motion information refinement methods described in the present disclosure can be performed by a decoder (e.g., by process 300A of FIG. 3A or 300B of FIG. 3B) or an encoder (e.g., by process 200A of FIG. 2A or 200B of FIG. 2B). Particularly, as described above, the disclosed decoding processes 300A, 300B and encoding processes 200A, 200B all include steps to perform motion prediction. Therefore, the disclosed methods can be used in these processes to refine the motion information. The disclosed motion information refinement methods can also be performed by one or more software or hardware components of an apparatus (e.g., apparatus 400 of FIG. 4). For example, a processor (e.g., processor 402 of FIG. 4) can perform the disclosed methods. In some embodiments, the disclosed methods can be implemented by a computer program product, embodied in a computer-readable medium, including computer-executable instructions, such as program code, executed by computers (e.g., apparatus 400 of FIG. 4).

In some embodiments, a non-transitory computer-readable storage medium storing a bitstream is also provided. The bitstream can be encoded and decoded according to the disclosed motion template-matching-based motion refinement methods.

The embodiments may further be described using the following clauses:

1. A method of encoding video content, the method comprising:
dividing a target coding block into a plurality of sub-blocks;
determining a plurality of sub-templates based on the plurality of subblocks; and
refining motion vectors of the plurality of subblocks based on the plurality of sub-templates.

2 The method according to clause 1, wherein refining the motion vectors of the plurality of subblocks comprises matching the plurality of sub-templates to a template of the target coding block.

3. The method according to clause 1, wherein determining the plurality of sub-templates comprises:
determining a plurality of motion vectors associated with the plurality of sub-blocks respectively; and
determining the plurality of sub-templates based on the determined plurality of motion vectors.

4. The method according to clause 1, wherein determining the plurality of sub-templates comprises:
determining a plurality of motion vectors by invoking an affine model; and
determining the plurality of sub-templates based on the determined plurality of motion vectors.

5. The method according to clause 1, wherein the plurality of subblocks comprises left boundary subblocks and top boundary subblocks of the target coding block, and determining the plurality of sub-templates comprises:

determining a plurality of motion vectors associated with at least one of the left boundary subblocks or top boundary subblocks; and determining the plurality of sub-templates based on the determined plurality of motion vectors.

6. The method according to clause 1, wherein refining the motion vectors of the plurality of subblocks further comprises:

refining at least one of a base motion vector of an affine model or a non-translation parameter of the affine model by matching the plurality of sub-templates to a template of the target coding block; and deriving the refined motion vectors of the plurality of subblocks based on the refined base motion vector of the affine model or the refined non-translation parameter of the affine model.

7. The method according to clause 1, wherein refining the motion vectors of the plurality of subblocks further comprises:

refining a control point motion vector (CPMV) by matching the plurality of sub-templates to a template of the target coding block; and deriving the refined motion vectors of the plurality of subblocks based on the refined CPMV.

8. The method according to clause 1, wherein refining the motion vectors of the plurality of subblocks further comprises:

determining a motion vector offset by matching the plurality of sub-templates to a template of the target coding block; and refining the motion vectors of the plurality of subblocks based on the motion vector offset.

9. The method according to clause 1, wherein refining the motion vectors of the plurality of subblocks comprises:

determining template matching costs at a plurality of search positions based on differences between the plurality of sub-templates and a template of the target coding block; and refining the motion vectors based on a search position with a minimum template matching cost.

10. The method according to clause 1, wherein refining the motion vectors of the plurality of subblocks comprises:

when the target coding block is a bi-predicted block, determining refined motion vectors of the plurality of subblocks associated with a first reference picture list, and determining, based on the determined refined motion vectors associated with the first reference picture list, motion vectors of the plurality of subblocks associated with a second reference picture list.

11. The method according to clause 1, wherein the motion vectors of the plurality of subblocks comprises a first set of motion vectors associated with a reference picture list 0 and a second set of motion vectors associated with a reference picture list 1, wherein the method further comprises:

if the first set of motion vectors producing a larger template matching cost than the second set of motion vectors, refining the first set of motion vectors and refining, based on the refined first set of motion vectors, the second set of motion vectors; or if the first set of motion vectors producing a smaller template matching cost than the second set of motion vectors, refining the second set of motion vectors and refining, based on the refined second set of motion vectors, the first set of motion vectors.

12. A method of decoding a bitstream associated with video content, the method comprising:

decoding the bitstream to reconstruct a target coding block, wherein the target coding block is divided into a plurality of subblocks;

determining a plurality of sub-templates based on the plurality of subblocks; and refining motion vectors of the plurality of subblocks based on the plurality of sub-templates.

13. The method according to clause 12, wherein refining the motion vectors of the plurality of subblocks comprises matching the plurality of sub-templates to a template of the target coding block.

14. The method according to clause 12, wherein determining the plurality of sub-templates comprises:

determining a plurality of motion vectors associated with the plurality of sub-blocks respectively; and determining the plurality of sub-templates based on the determined plurality of motion vectors.

15. The method according to clause 12, wherein determining the plurality of sub-templates comprises:

determining a plurality of motion vectors by invoking an affine model; and determining the plurality of sub-templates based on the determined plurality of motion vectors.

16. The method according to clause 12, wherein the plurality of subblocks comprises left boundary subblocks and top boundary subblocks of the target coding block, and determining the plurality of sub-templates comprises:

determining a plurality of motion vectors associated with at least one of the left boundary subblocks or top boundary subblocks; and determining the plurality of sub-templates based on the determined plurality of motion vectors.

17. The method according to clause 12, wherein refining the motion vectors of the plurality of subblocks further comprises:

refining at least one of a base motion vector of an affine model or a non-translation parameter of the affine model by matching the plurality of sub-templates to a template of the target coding block; and deriving the refined motion vectors of the plurality of subblocks based on the refined base motion vector of the affine model or the refined non-translation parameter of the affine model.

18. The method according to clause 12, wherein refining the motion vectors of the plurality of subblocks further comprises:

refining a control point motion vector (CPMV) by matching the plurality of sub-templates to a template of the target coding block; and deriving the refined motion vectors of the plurality of subblocks based on the refined CPMV.

19. The method according to clause 12, wherein refining the motion vectors of the plurality of subblocks further comprises:

determining a motion vector offset by matching the plurality of sub-templates to a template of the target coding block; and refining the motion vectors of the plurality of subblocks based on the motion vector offset.

20. The method according to clause 12, wherein refining the motion vectors of the plurality of subblocks comprises:

determining template matching costs at a plurality of search positions based on differences between the plurality of sub-templates and a template of the target coding block; and refining the motion vectors based on a search position with a minimum template matching cost.

21. The method according to clause 12, wherein refining the motion vectors of the plurality of subblocks comprises:

when the target coding block is a bi-predicted block, determining refined motion vectors of the plurality of subblocks associated with a first reference picture list, and determining, based on the determined refined motion vectors associated with the first reference picture list, motion vectors of the plurality of subblocks associated with a second reference picture list.

22. The method according to clause 12, wherein the motion vectors of the plurality of subblocks comprises a first set of motion vectors associated with a reference picture list 0 and a second set of motion vectors associated with a reference picture list 1, wherein the method further comprises:

if the first set of motion vectors producing a larger template matching cost than the second set of motion vectors, refining the first set of motion vectors and refining, based on the refined first set of motion vectors, the second set of motion vectors; or if the first set of motion vectors producing a smaller template matching cost than the second set of motion vectors, refining the second set of motion vectors and refining, based on the refined second set of motion vectors, the first set of motion vectors.

23. A method of storing a bitstream associated with video content, the method comprising:

dividing a target coding block into a plurality of subblocks;

determining a plurality of sub-templates based on the plurality of subblocks;

refining motion vectors of the plurality of subblocks based on the plurality of sub-templates;

generating the bitstream based on the refined motion vectors; and storing the bitstream in a non-transitory computer-readable storage medium.

24. The method according to clause 23, wherein refining the motion vectors of the plurality of subblock comprises matching the plurality of sub-templates to a template of the target coding block.

25. The method according to clause 23, wherein determining the plurality of sub-templates comprises:

determining a plurality of motion vectors associated with the plurality of subblocks respectively; and determining the plurality of sub-templates based on the determined plurality of motion vectors.

26. The method according to clause 23, wherein determining the plurality of sub-templates comprises:

determining a plurality of motion vectors by invoking an affine model; and determining the plurality of sub-templates based on the determined plurality of motion vectors.

27. The method according to clause 23, wherein the plurality of subblocks comprises left boundary subblocks and top boundary subblocks of the target coding block, and determining the plurality of sub-templates comprises:

determining a plurality of motion vectors associated with at least one of the left boundary subblocks or top boundary subblocks; and determining the plurality of sub-templates based on the determined plurality of motion vectors.

28. The method according to clause 23, wherein refining the motion vectors of the plurality of subblocks further comprises:

refining at least one of a base motion vector of an affine model or a non-translation parameter of the affine model by matching the plurality of sub-templates to a template of the target coding block; and deriving the refined motion vectors of the plurality of subblocks based on the refined base motion vector of the affine model or the refined non-translation parameter of the affine model.

29. The method according to clause 23, wherein refining the motion vectors of the plurality of subblocks further comprises:

refining a control point motion vector (CPMV) by matching the plurality of sub-templates to a template of the target coding block; and deriving the refined motion vectors of the plurality of subblocks based on the refined CPMV.

30. The method according to clause 23, wherein refining the motion vectors of the plurality of subblocks further comprises:

determining a motion vector offset by matching the plurality of sub-templates to a template of the target coding block; and refining the motion vectors of the plurality of subblocks based on the motion vector offset.

31. The method according to clause 23, wherein refining the motion vectors of the plurality of subblocks comprises:

determining template matching costs at a plurality of search positions based on differences between the plurality of sub-templates and a template of the target coding block and refining the motion vectors based on a search position with a minimum template matching cost.

32. The method according to clause 23, wherein refining the motion vectors of the plurality of subblocks comprises:

when the target coding block is a bi-predicted block, determining refined motion vectors of the plurality of subblocks associated with a first reference picture list, and determining, based on the determined refined motion vectors associated with the first reference picture list, motion vectors of the plurality of subblocks associated with a second reference picture list.

33. The method according to clause 23, wherein the motion vectors of the plurality of subblocks comprises a first set of motion vectors associated with a reference picture list 0 and a second set of motion vectors associated with a reference picture list 1, wherein the method further comprises:

if the first set of motion vectors producing a larger template matching cost than the second set of motion vectors, refining the first set of motion vectors and refining, based on the refined first set of motion vectors, the second set of motion vectors; or if the first set of motion vectors producing a smaller template matching cost than the second set of motion vectors, refining the second set of motion vectors and refining, based on the refined second set of motion vectors, the first set of motion vectors.

34. A data signal representing a bitstream comprising coded information for decoding according to:
decoding the coded information to reconstruct a target coding block, wherein the target coding block is divided into a plurality of subblocks;
determining a plurality of sub-templates based on the plurality of subblocks; and
refining motion vectors of the plurality of subblocks based on the plurality of sub-templates.

35. The data signal according to clause 34, wherein refining the motion vectors of the plurality of subblocks comprises matching the plurality of sub-templates to a template of the target coding block.

36. The data signal according to clause 34, wherein determining the plurality of sub-templates comprises:
determining a plurality of motion vectors associated with the plurality of sub-blocks respectively; and
determining the plurality of sub-templates based on the determined plurality of motion vectors.

37. The data signal according to clause 34, wherein determining the plurality of sub-templates comprises:
determining a plurality of motion vectors by invoking an affine model; and
determining the plurality of sub-templates based on the determined plurality of motion vectors.

38. The data signal according to clause 34, wherein the plurality of subblocks comprises left boundary subblocks and top boundary subblocks of the target coding block, and determining the plurality of sub-templates comprises:
determining a plurality of motion vectors associated with at least one of the left boundary subblocks or top boundary subblocks; and
determining the plurality of sub-templates based on the determined plurality of motion vectors.

39. The data signal according to clause 34, wherein refining the motion vectors of the plurality of subblocks further comprises:
refining at least one of a base motion vector of an affine model or a non-translation parameter of the affine model by matching the plurality of sub-templates to a template of the target coding block; and
deriving the refined motion vectors of the plurality of subblocks based on the refined base motion vector of the affine model or the refined non-translation parameter of the affine model.

40. The data signal according to clause 34, wherein refining the motion vectors of the plurality of subblocks further comprises:
refining a control point motion vector (CPMV) by matching the plurality of sub-templates to a template of the target coding block; and
deriving the refined motion vectors of the plurality of subblocks based on the refined CPMV.

41. The data signal according to clause 34, wherein refining the motion vectors of the plurality of subblocks further comprises:
determining a motion vector offset by matching the plurality of sub-templates to a template of the target coding block; and
refining the motion vectors of the plurality of subblocks based on the motion vector offset.

42. The data signal according to clause 34, wherein refining the motion vectors of the plurality of subblocks comprises:
determining template matching costs at a plurality of search positions based on differences between the plurality of sub-templates and a template of the target coding block; and
refining the motion vectors based on a search position with a minimum template matching cost.

43. The data signal according to clause 34, wherein refining the motion vectors of the plurality of subblocks comprises:
when the target coding block is a bi-predicted block, determining refined motion vectors of the plurality of subblocks associated with a first reference picture list, and determining, based on the determined refined motion vectors associated with the first reference picture list, motion vectors of the plurality of subblocks associated with a second reference picture list.

44. The data signal according to clause 34, wherein the motion vectors of the plurality of subblocks comprises a first set of motion vectors associated with a reference picture list 0 and a second set of motion vectors associated with a reference picture list 1, wherein the method further comprises:
if the first set of motion vectors producing a larger template matching cost than the second set of motion vectors, refining the first set of motion vectors and refining, based on the refined first set of motion vectors, the second set of motion vectors; or
if the first set of motion vectors producing a smaller template matching cost than the second set of motion vectors, refining the second set of motion vectors and refining, based on the refined second set of motion vectors, the first set of motion vectors.

45. A computer readable medium storing a bitstream, wherein the bitstream is generated according to:
dividing a target coding block is divided into a plurality of subblocks;
determining a plurality of sub-templates based on the plurality of subblocks;
refining motion vectors of the plurality of subblocks based on the plurality of sub-templates; and
generating the bitstream based on the refined motion vectors.

46. The computer readable medium according to clause 44, wherein refining the motion vectors of the plurality of subblocks comprises matching the plurality of sub-templates to a template of the target coding block.

47. The computer readable medium according to clause 44, wherein determining the plurality of sub-templates comprises:
determining a plurality of motion vectors associated with the plurality of sub-blocks respectively; and
determining the plurality of sub-templates based on the determined plurality of motion vectors.

48. The computer readable medium according to clause 44, wherein determining the plurality of sub-templates comprises:
determining a plurality of motion vectors by invoking an affine model; and
determining the plurality of sub-templates based on the determined plurality of motion vectors.

49. The computer readable medium according to clause 44, wherein the plurality of subblocks comprises left boundary subblocks and top boundary subblocks of the target coding block, and determining the plurality of sub-templates comprises:

determining a plurality of motion vectors associated with at least one of the left boundary subblocks or top boundary subblocks; and determining the plurality of sub-templates based on the determined plurality of motion vectors.

50. The computer readable medium according to clause 44, wherein refining the motion vectors of the plurality of subblocks further comprises:

refining at least one of a base motion vector of an affine model or a non-translation parameter of the affine model by matching the plurality of sub-templates to a template of the target coding block; and deriving the refined motion vectors of the plurality of subblocks based on the refined base motion vector of the affine model or the refined non-translation parameter of the affine model.

51. The computer readable medium according to clause 44, wherein refining the motion vectors of the plurality of subblocks further comprises:

refining a control point motion vector (CPMV) by matching the plurality of sub-templates to a template of the target coding block; and deriving the refined motion vectors of the plurality of subblocks based on the refined CPMV.

52. The computer readable medium according to clause 44, wherein refining the motion vectors of the plurality of subblocks further comprises:

determining a motion vector offset by matching the plurality of sub-templates to a template of the target coding block; and refining the motion vectors of the plurality of subblocks based on the motion vector offset.

53. The computer readable medium according to clause 44, wherein refining the motion vectors of the plurality of subblocks comprises:

determining template matching costs at a plurality of search positions based on differences between the plurality of sub-templates and a template of the target coding block; and refining the motion vectors based on a search position with a minimum template matching cost.

54. The computer readable medium according to clause 44, wherein refining the motion vectors of the plurality of subblocks comprises:

when the target coding block is a bi-predicted block, determining refined motion vectors of the plurality of subblocks associated with a first reference picture list, and determining, based on the determined refined motion vectors associated with the first reference picture list, motion vectors of the plurality of subblocks associated with a second reference picture list.

55. The computer readable medium according to clause 44, wherein the motion vectors of the plurality of subblocks comprises a first set of motion vectors associated with a reference picture list 0 and a second set of motion vectors associated with a reference picture list 1, wherein the method further comprises:

if the first set of motion vectors producing a larger template matching cost than the second set of motion vectors, refining the first set of motion vectors and refining, based on the refined first set of motion vectors, the second set of motion vectors; or if the first set of motion vectors producing a smaller template matching cost than the second set of motion vectors, refining the second set of motion vectors and refining, based on the refined second set of motion vectors, the first set of motion vectors.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as “first” and “second” are used only to differentiate an entity or operation from another entity or operation, and do not require or imply any actual relationship or sequence between these entities or operations. Moreover, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term “or” encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments.

Accordingly, although specific terms are employed, they are used in a generic and descriptive sense only and not for purposes of limitation.

What is claimed is:

1. A method of encoding video content, the method comprising:

dividing a target coding block into a plurality of subblocks;

determining a plurality of sub-templates based on the plurality of subblocks; and refining motion vectors of the plurality of subblocks based on the plurality of sub-templates, wherein refining the motion vectors of the plurality of subblocks comprises:

in response to the target coding block being a bi-predicted block, determining refined motion vectors of the plurality of subblocks associated with a first reference picture list, and determining, based on the determined refined motion vectors associated with the first reference picture list, motion vectors of the plurality of subblocks associated with a second reference picture list.

2. The method according to claim 1, wherein refining the motion vectors of the plurality of subblocks comprises matching the plurality of sub-templates to a template of the target coding block.

3. The method according to claim 1, wherein determining the plurality of sub-templates comprises:

determining a plurality of motion vectors associated with the plurality of sub-blocks respectively; and determining the plurality of sub-templates based on the determined plurality of motion vectors.

4. The method according to claim 1, wherein determining the plurality of sub-templates comprises:

determining a plurality of motion vectors by invoking an affine model; and determining the plurality of sub-templates based on the determined plurality of motion vectors.

5. The method according to claim 1, wherein the plurality of subblocks comprises left boundary subblocks and top boundary subblocks of the target coding block, and determining the plurality of sub-templates comprises:

determining a plurality of motion vectors associated with at least one of the left boundary subblocks or top boundary subblocks; and determining the plurality of sub-templates based on the determined plurality of motion vectors.

6. The method according to claim 1, wherein refining the motion vectors of the plurality of subblocks further comprises:

refining at least one of a base motion vector of an affine model or a non-translation parameter of the affine model by matching the plurality of sub-templates to a template of the target coding block; and deriving the refined motion vectors of the plurality of subblocks based on the refined base motion vector of the affine model or the refined non-translation parameter of the affine model.

7. The method according to claim 1, wherein refining the motion vectors of the plurality of subblocks further comprises:

refining a control point motion vector (CPMV) by matching the plurality of sub-templates to a template of the target coding block; and deriving the refined motion vectors of the plurality of subblocks based on the refined CPMV.

8. The method according to claim 1, wherein refining the motion vectors of the plurality of subblocks further comprises:

determining a motion vector offset by matching the plurality of sub-templates to a template of the target coding block; and refining the motion vectors of the plurality of subblocks based on the motion vector offset.

9. The method according to claim 1, wherein refining the motion vectors of the plurality of subblocks comprises:

determining template matching costs at a plurality of search positions based on differences between the plurality of sub-templates and a template of the target coding block; and refining the motion vectors based on a search position with a minimum template matching cost.

10. The method according to claim 1, wherein the motion vectors of the plurality of subblocks comprises a first set of motion vectors associated with a reference picture list 0 and a second set of motion vectors associated with a reference picture list 1, wherein the method further comprises:

if the first set of motion vectors producing a larger template matching cost than the second set of motion vectors, refining the first set of motion vectors and refining, based on the refined first set of motion vectors, the second set of motion vectors; or if the first set of motion vectors producing a smaller template matching cost than the second set of motion vectors, refining the second set of motion vectors and refining, based on the refined second set of motion vectors, the first set of motion vectors.

11. A method of decoding a bitstream associated with video content, the method comprising:

decoding the bitstream to reconstruct a target coding block, wherein the target coding block is divided into a plurality of subblocks;

determining a plurality of sub-templates based on the plurality of subblocks; and refining motion vectors of the plurality of subblocks based on the plurality of sub-templates, wherein refining the motion vectors of the plurality of subblocks comprises:

in response to the target coding block being a bi-predicted block, determining refined motion vectors of the plurality of subblocks associated with a first reference picture list, and determining, based on the determined refined motion vectors associated with the first reference picture list, motion vectors of the plurality of subblocks associated with a second reference picture list.

12. The method according to claim 11, wherein refining the motion vectors of the plurality of subblocks comprises matching the plurality of sub-templates to a template of the target coding block.

13. The method according to claim 11, wherein determining the plurality of sub-templates comprises:

determining a plurality of motion vectors associated with the plurality of sub-blocks respectively; and determining the plurality of sub-templates based on the determined plurality of motion vectors.

14. The method according to claim 11, wherein determining the plurality of sub-templates comprises:

determining a plurality of motion vectors by invoking an affine model; and determining the plurality of sub-templates based on the determined plurality of motion vectors.

15. The method according to claim 11, wherein the plurality of subblocks comprises left boundary subblocks and top boundary subblocks of the target coding block, and determining the plurality of sub-templates comprises:

determining a plurality of motion vectors associated with at least one of the left boundary subblocks or top boundary subblocks; and determining the plurality of sub-templates based on the determined plurality of motion vectors.

16. The method according to claim 11, wherein refining the motion vectors of the plurality of subblocks further comprises:

refining at least one of a base motion vector of an affine model or a non-translation parameter of the affine model by matching the plurality of sub-templates to a template of the target coding block; and deriving the refined motion vectors of the plurality of subblocks based on the refined base motion vector of the affine model or the refined non-translation parameter of the affine model.

17. The method according to claim 11, wherein refining the motion vectors of the plurality of subblocks further comprises:

refining a control point motion vector (CPMV) by matching the plurality of sub-templates to a template of the target coding block; and deriving the refined motion vectors of the plurality of subblocks based on the refined CPMV.

18. The method according to claim 11, wherein refining the motion vectors of the plurality of subblocks further comprises:

determining a motion vector offset by matching the plurality of sub-templates to a template of the target coding block; and refining the motion vectors of the plurality of subblocks based on the motion vector offset.

19. A method of storing a bitstream associated with video content, the method comprising:

dividing a target coding block into a plurality of subblocks;

determining a plurality of sub-templates based on the plurality of subblocks;

refining motion vectors of the plurality of subblocks based on the plurality of sub-templates, wherein refining the motion vectors of the plurality of subblocks comprises:

in response to the target coding block being a bi-predicted block, determining refined motion vectors of the plurality of subblocks associated with a first reference picture list, and determining, based on the determined refined motion vectors associated with the first reference picture list, motion vectors of the plurality of subblocks associated with a second reference picture list;

generating the bitstream based on the refined motion vectors; and storing the bitstream in a non-transitory computer-readable storage medium.

* * * * *